United States Patent
Panga et al.

(10) Patent No.: US 12,423,329 B2
(45) Date of Patent: Sep. 23, 2025

(54) CLUSTER BASED NODE ASSIGNMENT IN MULTI-DIMENSIONAL FEATURE SPACE

(71) Applicant: Oracle International Corporation, Redwood Shores, CA (US)

(72) Inventors: Ravi Panga, Ontario (CA); Cait Moran, Altamonte Springs, FL (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/442,966

(22) Filed: Feb. 15, 2024

(65) Prior Publication Data
US 2025/0265270 A1    Aug. 21, 2025

(51) Int. Cl.
G06F 7/00      (2006.01)
G06F 16/22     (2019.01)
G06F 16/28     (2019.01)
G06F 17/00     (2019.01)
G06N 3/0455    (2023.01)
G06N 3/096     (2023.01)

(52) U.S. Cl.
CPC ........ *G06F 16/285* (2019.01); *G06F 16/2264* (2019.01); *G06N 3/0455* (2023.01); *G06N 3/096* (2023.01)

(58) Field of Classification Search
CPC . G06F 16/285; G06F 16/2264; G06N 3/0455; G06N 3/096
USPC ........................................................ 707/739
See application file for complete search history.

(56) References Cited

U.S. PATENT DOCUMENTS

| | | | | |
|---|---|---|---|---|
| 10,872,236 | B1* | 12/2020 | Elor | .................... G06V 30/1452 |
| 2015/0095333 | A1* | 4/2015 | Porpora | ................... G06F 16/35 |
| | | | | 707/754 |
| 2016/0364467 | A1* | 12/2016 | Gupta | .................... G06F 16/285 |
| 2018/0089328 | A1* | 3/2018 | Bath | ..................... G06F 16/901 |
| 2022/0012268 | A1 | 1/2022 | Ghoshal et al. | |

OTHER PUBLICATIONS

"Network Analysis", An overview, Science Direct Topics, https://www.sciencedirect.com/topics/social-sciences/network-analysis, May 13, 2024, 8 pages.

(Continued)

*Primary Examiner* — Pavan Mamillapalli
(74) *Attorney, Agent, or Firm* — Mughal Gaudry & Franklin PC

(57) ABSTRACT

A system and computer-implemented method includes accessing a set of clusters, where each cluster is defined to cover a portion of a multi-dimensional feature space, and each cluster is associated with a label of a plurality of labels. A plurality of content items is received from a plurality of data sources. The label is assigned to each of the plurality of content items using one or more label machine learning models. Using a feature-vector machine learning model, a set of feature vectors for the plurality of content items are identified. A feature vector is associated with a respective portion in the multi-dimensional feature space. Portions in the multi-dimensional feature space corresponding to the plurality of labels are identified. A cluster from the plurality of clusters is assigned to the feature vector based on a proximity of the feature vector to the plurality of clusters in the multi-dimensional feature space.

18 Claims, 22 Drawing Sheets

(56) References Cited

OTHER PUBLICATIONS

"Relation Extraction", Papers with Code, https://paperswithcode.com/task/relation-extraction, May 13, 2024, 10 pages.
"Relationship Extraction", http://nlpprogress.com/english/relationship_extraction.html, May 13, 2024, 6 pages.
Fourrier, C. "Introduction to Graph Machine Learning", https://huggingface.co/blog/intro-graphml, Jan. 3, 2023, 15 pages.
Kearns, C., "Graph analytics 101: reveal the story behind your data", https://cambridge-intelligence.com/graph-analytics-101, Jun. 29, 2021, 9 pages.
Wadhwa, S. et al., "Revisiting Relation Extraction in the era of Large Language Models", arXiv:2305.05003v1, May 8, 2023, 22 pages.
International Search Report and Written Opinion for PCT Application No. PCT/US2025/015630, dated May 13, 2025.
Liu, Z. et al., "Universal Vision-Language Dense Retrieval: Learning A Unified Representation Space for Multi-Modal Retrieval", ARXIV.org, Feb. 5, 2023.
Wikipedia, "Word2vec", retrieved from the internet at https://en.wikipedia.org/w/index.php, on Jan. 30, 2024.

* cited by examiner

| Relationship_type | number of labelled data | labels(subject and object) |
|---|---|---|
| Joint venture | 21 | company1, company2 |
| acquisition | 51 | acquirer, acquiree |
| merger | 17 | merger, mergee |
| company_funding | 16 | investor, investee |
| bankruptcy | 7 | company |
| total | 112 | |

FIG. 11

| ID 1202 | Version 1204 | CTIME 1206 | MTIME 1208 | Linked_T 1210 | Linked_T 1212 | Value 1214 | Old_Val 1216 | Source 1218 |
|---|---|---|---|---|---|---|---|---|
| 5c9fe7d9c60 | 1 | 44:41.6 | 44:41.6 | 5e9fe78cb0 | Company Funding | | | 596500b490 |
| 6099c9b39a | 1 | 13:23.9 | 13:23.9 | 6099c9b39a | Company Funding | {"investors":[{"investor_ty | | 58a524e0ab |
| 5cb682ac82c | 1 | 34:36.8 | 34:36.8 | 5cb682ac82c | Company Funding | {"investors":[{"investor_ty | | 58b86ae2eb |
| 5c8c1d9296c | 1 | 48:02.5 | 48:02.5 | 5c8c1d9296c | Company Funding | {"investors":[{"investor_ty | | 594c17b5938 |
| 5c881e758e | 1 | 02:45.2 | 02:45.2 | 5c881e758e | Company Funding | {"investors":[{"investor_ty | | 594c17b5938 |
| 5c88227722a | 1 | 19:46.9 | 19:46.9 | 5c88227722a | Company Funding | {"investors":[{"investor_ty | | 594c17b5938 |
| 5fd81af8658 | 1 | 10:00.4 | 10:00.4 | 5fd81af8658 | Company Funding | {"investors":[{"investor_ty | | 591aeeb02a |
| 6234213b73C | 1 | 05:31.1 | 05:31.1 | 6820e72a010 | Company Funding | {"roundcode":"roundcode | | 591aeeb02a |
| 5fd948e6658 | 1 | 38:15.0 | 38:15.0 | 5fd948e6658 | Company Funding | {"investors":[{"investor_ty | | 591aeeb02a |

FIG. 12A

1200 prompt = '"you are an entities and relationship extractor.
context: where relationship should be one among the [acquisition | funding | joint venture | merger | bankruptcy | others] and entities are companies (acquirer, acquirees | investor, investees | company, companies | merger, mergees | others respectively Output should be company names || relationship types, when there are multiple companys use ++ and close with square brackets |]

Examples:
Text: CertaSite Acquires Starfire Systems and Starfire Extinguisher Company
Output: CertaSite || [Starfire Systems ++ Starfire Extinguisher Company] || acquisition Text: ByAllAccounts was acquired by Morningstar for $28 million
Output: Morningstar || ByAllAccounts || Acquisition Text:On July 28, 2015 press release, the AYALA Group has raised its stake in the Philippine education sector by Anvesting P450 Million to acquire 60 percent of University of Nueva Caceres
Output: AYALA Group || University of Nueva Caceres || Acquisition Text: dbt Labs (previously Fishtown Analytics) announced that it raised $150M in Series C financing. With this raise, the team will speed the development of dbt, its open-source analytics engineering tool. The round was co-led by Altimeter, Sequoia Capital, and Andreessen Horowitz with participation from Amplify Partners. Sequoia Capital, Andreessen Horowitz, and Amplify Partners are all existing investors. No new board members are joining the team.
Output: dbt Labs|| [Sequoia Capital ++ Andreessen Horowitz ++ Amplify Partners] || Funding

FIG. 13

CLUSTER BASED NODE ASSIGNMENT IN MULTI-DIMENSIONAL FEATURE SPACE

FIELD

The present disclosure relates generally to machine-learning models and techniques. More particularly, the present disclosure relates to systems and methods that utilize a natural language processing model and/or technique for generating clusters that represent relationship and relationship-type between one or more entities.

BACKGROUND

News articles have been an eternal source for providing information regarding various events and developments in organizations and/or corporate entities. The information regarding the key events and developments pertains to relationships between one or more corporate entities. For example, the relationships between the one or more entities include whether a large-sized entity has acquired a medium-sized entity or a small-sized entity, whether a large-sized entity has partnered with another large-sized entity, whether a group of different entities has joined together to serve a particular industrial function or domain, whether a particular entity intends to buy a stake in one or more entities, whether one or more entities are running short on resources, etc. Such information and announcements provide insights that are helpful in defining recent shifts and trends across different operational areas and/or industries served by the entities. However, it requires a lot of expertise and knowledge to understand and derive insights from the information provided by these news articles.

Apart from the expertise and knowledge, information provided by the news articles seems to appeal to a particular group of people. A person who is not well-versed with the requisite knowledge may not be able to derive meaningful insights from the news articles or may miss out on some important information impacting business and functional aspects of entities.

Recent advancement in technology has provided various tools and data models that provide such complex information into an intuitive and easy-to-understand format. For example, the subject matter expert may be able to summarize the complex information and/or generate visual representations like Gantt charts, pie charts, bar graphs etc., depicting the complex information in an intuitive manner. These summaries and charts still require human intervention. Freely available automated tools and data models that transform this complex information may pose a threat related to data integrity and compliance as it requires access to an entity's secured, private, and confidential information. Additionally, machine learning algorithms can ineffectively gather meaningful insights for unstructured data sets. Moreover, generating data models and tools for such complex dataset can be computationally expensive and labor intensive for traditional spreadsheet approaches.

As the nature of information expands in complexity, relying on human intervention and/or freely available tools can be time consuming. Thus, there is a critical need to improve existing tools and/or develop new tools to accurately track features within and across the domain to provide exhaustive and detailed insights for enhance decision making in entities, without compromising on the data integrity and security.

BRIEF SUMMARY

In one embodiment, a system and computer-implemented method includes accessing a set of clusters, where each cluster is defined to cover a portion of a multi-dimensional feature space, and each cluster is associated with a label of a plurality of labels. A plurality of content items is received from a plurality of data sources. The label is assigned to each of the plurality of content items using one or more label machine learning models. Using a feature-vector machine learning model, a set of feature vectors for the plurality of content items are identified. A feature vector is associated with a respective portion in the multi-dimensional feature space. Portions in the multi-dimensional feature space corresponding to the plurality of labels are identified. A cluster from the plurality of clusters is assigned to the feature vector based on a proximity of the feature vector to the plurality of clusters in the multi-dimensional feature space.

In an embodiment, a computer-implemented method includes accessing a set of clusters from a plurality of clusters, where each cluster is defined to cover a portion of a multi-dimensional feature space, and each cluster of the plurality of clusters is associated with a label of a plurality of labels. The method further includes receiving a plurality of content items from a plurality of data sources. The method further includes assigning the label of the plurality of labels to each of the plurality of content items using one or more label machine learning models and identifying, using a feature-vector machine learning model, a set of feature vectors for the plurality of content items. A feature vector of the set of feature vectors is associated with a respective portion in the multi-dimensional feature space. The method further includes identifying in the multi-dimensional feature space using the plurality of clusters, portions corresponding to the plurality of labels. The method further includes determining, for assigning to the feature vector, a cluster from the plurality of clusters, based on a proximity of the feature vector to the plurality of clusters in the multi-dimensional feature space and assigning the feature vector to the determined cluster in the portion of the multi-dimensional feature space covered by the cluster.

In another embodiment, a system comprising one or more processors, and a memory coupled to the one or more processors, the memory storing a plurality of instructions executable by the one or more processors, the plurality of instructions that when executed by the one or more processors cause the one or more processors to perform a set of operations. A set of clusters is accessed from a plurality of clusters, where each cluster is defined to cover a portion of a multi-dimensional feature space, and each cluster of the plurality of clusters is associated with a label of a plurality of labels. A plurality of content items is received from a plurality of data sources. The label of the plurality of labels is assigned to each of the plurality of content items using one or more label machine learning models and, using a feature-vector machine learning model, a set of feature vectors for the plurality of content items are identified. A feature vector of the set of feature vectors is associated with a respective portion in the multi-dimensional feature space. Portions corresponding to the plurality of labels are identified in the multi-dimensional feature space using the plurality of clusters. A cluster from the plurality of clusters is determined for assigning to the feature vector based on a proximity of the feature vector to the plurality of clusters in the multi-dimensional feature space and the feature vector is assigned to the determined cluster in the portion of the multi-dimensional feature space covered by the cluster.

In yet another embodiment, a non-transitory computer-readable medium storing a plurality of instructions executable by one or more processors that cause the one or more processors to perform operations. In one step, a set of clusters is accessed from a plurality of clusters, where each cluster is defined to cover a portion of a multi-dimensional feature space, and each cluster of the plurality of clusters is associated with a label of a plurality of labels. A plurality of content items is received from a plurality of data sources. The label of the plurality of labels is assigned to each of the plurality of content items using one or more label machine learning models and, using a feature-vector machine learning model, a set of feature vectors for the plurality of content items are identified. A feature vector of the set of feature vectors is associated with a respective portion in the multi-dimensional feature space. Portions corresponding to the plurality of labels are identified in the multi-dimensional feature space using the plurality of clusters. A cluster from the plurality of clusters is determined for assigning to the feature vector based on a proximity of the feature vector to the plurality of clusters in the multi-dimensional feature space and the feature vector is assigned to the determined cluster in the portion of the multi-dimensional feature space covered by the cluster.

In various aspects, a system is provided that includes one or more data processors and a non-transitory computer readable storage medium containing instructions which, when executed on the one or more data processors, cause the one or more data processors to perform part or all of one or more methods disclosed herein.

In various aspects, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 11 relates to a table that shows label types and number of labelled data and nodes/entities according to some embodiments of the invention.

FIGS. 12A-12B illustrate a GUI that shows data/content extraction and tagging of the data into labels according to some embodiments of the invention.

FIG. 13 shows a GUI that represents the prompt, context and output from the prompt according to some embodiments of the invention.

DETAILED DESCRIPTION

Figure 1A:
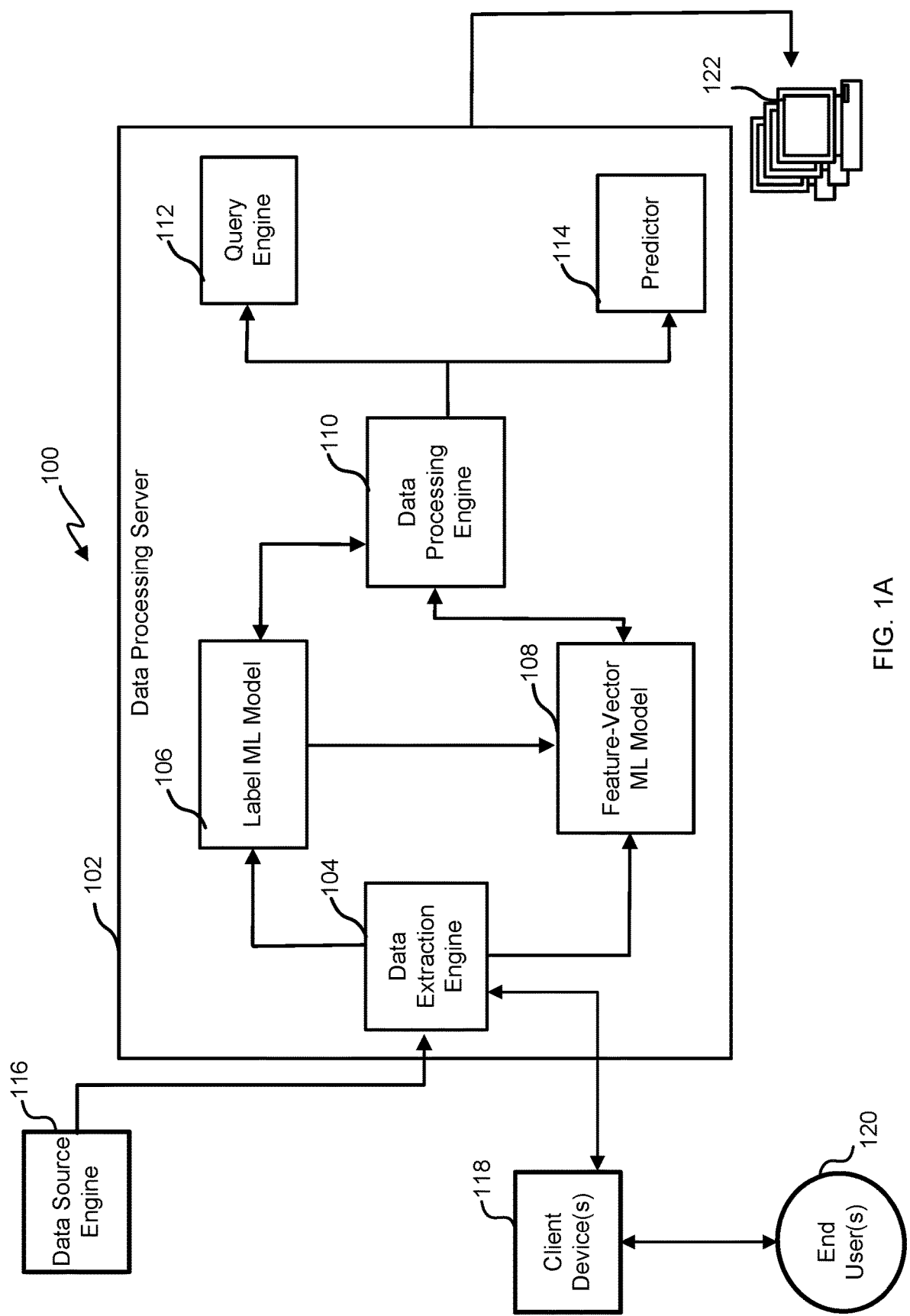
FIG. 1A shows an exemplary system for acquiring, processing, and transforming news articles according to some embodiments of the invention.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Certain aspects and features of the present disclosure relate to a computer-implemented method and a system for providing detailed insights for enhancing decision making in entities. Content items can be received from multiple sources, such as news articles, blogs associated with news, webpages, etc. A content item may include all or part of: a webpage, an online post (e.g., social-media post or post to a news channel), a blog, a video blog, an app-based message, or other online or print content item related to one or more entities. One or more particular labels are assigned to each content item of the multiple content items. The labels are assigned using one or more label machine learning models. The labels include merger, acquisition, funding, bankruptcy, etc. The content items are presented to a user on a user interface. The user may select a label, or the label may be automatically selected based on predefined user preferences, recent trends and/or other preselected criteria. Accordingly, a set of content items are selected from the multiple content items that are associated with the selected label.

A set of feature vectors are identified for the set of content items using a feature-vector machine learning model. A feature vector includes entities and relationship types. The set of feature vectors are clustered into multiple clusters according to the labels of the content items of the feature vectors and then for each of the clusters, representative content items that are assigned to the cluster are identified. The clusters include nodes and edges, the nodes are associated with an identifier of entities and the edges are associated with relationship and/or the relationship-type of the entities. The representative content items include information on the entities and relationship between the entities that are represented by the clusters. The representative content items are availed on the user interface.

An identification of each of the one or more representative content items is provided to the user on a user interface. The identification includes a label associated with the representative content item. Further, an indication is received for each representative content item of the cluster as to whether the label corresponds to the representative content item. Further, trends like future acquisitions, mergers or bankruptcy of an entity may be predicted based on the information provided by the representative content item. The trends represent predictions or performance statistics associated with the entities, companies, etc. The trends are associated with at least one of the multiple clusters by using the information presented by the representative content item. The trends are generated based on a fine-tuning of clusters, such that a subsequent one or more other feature vectors corresponding to one or more other content items can be more accurately classified for a purpose which might be for trend identification or might be for another purpose, such as sentiment prediction, search-engine support, etc.

In other embodiments, certain aspects and features of the present disclosure relate to a computer-implemented method and a system for processing a new content item related to entities. A set of clusters are accessed from multiple clusters, where each cluster is defined to cover a portion of a multi-dimensional feature space. Each cluster of the multiple clusters is associated with a label. Further, multiple content items are received from multiple sources, such as online news articles, blogs, etc. A label is assigned to each of the content items using one or more label machine learning models. A set of feature vectors are identified for the content items. The set of feature vectors are identified using a feature-vector machine learning model. A feature vector of the set of feature vectors is associated with a respective portion in the multi-dimensional feature space. Portions corresponding to a plurality of labels are identified in the multi-dimensional feature space using the clusters. A cluster is determined for the feature vector from the multiple clusters based on a proximity of the feature vector to the clusters. The proximity is determined based on a similarity score between the label of the feature vector and the labels of the multiple clusters. The feature vector is assigned to the cluster in the portion of the multi-dimensional feature space. Further, a new cluster is created based on the assigning of the feature vector.

FIG. 1A illustrates an exemplary system 100 for acquiring, processing, and transforming news articles according to some embodiments of the invention. The system 100 illustrates an exemplary block diagram of functional and/or structural components of a system employing machine-learning techniques based on one or more natural language processing algorithms to represent one or more clusters depicting one or more entities and a relationship and/or relationship-type of the one or more entities. In an embodiment, the entities may include, but are not limited to, firms, corporate entities, private or public organizations, etc. The system 100 includes a data processing server 102 for processing information received from multiple sources. In some embodiments, the data processing server 102 includes a data extraction engine 104, one or more label machine learning (ML) model(s) 106, one or more feature-vector ML model(s) 108, a data processing engine 110, a query engine 112, and a predictor 114.

The data processing server 102 performs a part and/or all functionalities of the system 100. The data processing server 102 may represent any single computing system with dedicated hardware and software, multiple computing systems clustered together (e.g., a server farm), a portion of shared resources on one or more computing systems (e.g., virtual server), or any combination thereof. The data processing server 102 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The data processing server 102 can include one or more virtual machines running virtual operating systems, or other computing architectures involving virtualization such as one or more flexible pools of logical storage devices that can be virtualized to maintain virtual storage devices for the server. In various embodiments, the data processing server 102 may be adapted to run one or more services or software applications that provide the functionality described in the foregoing disclosure.

The data extraction engine 104 acquires data from multiple data sources. In some embodiments, the data extraction engine 104 acquires the data through a data source engine 116. In some other embodiments, the data extraction engine 104 acquires the data from one or more client device(s) 118 associated with one or more end user(s) 120. All the data acquired by the data extraction engine 104 is collectively referred to as content items. The content items acquired from the multiple sources include information regarding key developments and events pertaining to corporate entities. The multiple data sources may include one or more public data sources such as online news articles and videos associated with the published news articles and/or one or more private data sources such as data sources linked with specific entities defining the key developments and events related to functional, operational, structural, and performance related events of specific entities. The key developments and events can include, but are not limited to, acquisitions, joint ventures, mergers, bankruptcy, layoffs, law suites, funding etc. Such key developments and events form an integral part in determining the functional, structural, operational and performance aspects of one or more entities.

The end user 120 uses the client device 118 for selection of labels corresponding to which the content items are presented on a user interface of the client device 118. The performance trends and clusters are displayed to the end user 120 on the client device 118. The user station 122 is associated with the end user 120 and may also display the performance trends and clusters to the end user 120. In an embodiment, the client device 118 is referred to as the user device and the end user 120 is referred to as the user.

The data extraction engine 104 pre-processes the content items to filter out unstructured data and redundant data. The data extraction engine 104 may identify related contents (data objects) from the content items received from various sources. For example, relevant paragraphs of the news articles may be extracted in the form of multiple data objects. The pre-processed data is provided to the label ML model 106 and the feature-vector ML model 108. Additional details regarding the functional and/or structural components of the data extraction engine 104 are explained in detail below with reference to FIG. 2.

The label ML model 106 assigns a label or category to each content item of multiple content items. The data objects include content related to entities and their relationships. The label machine learning model 106 is a model that assigns one or more labels (or even no labels) to each content item. The label ML model 106 includes one or more label machine learning models. In an embodiment, a different ML model may be used for each label (for example, where a "merger" model generates a likelihood that a content item relates to a merger topic, etc.) Further, the label ML model 106 selects a set of content items from the multiple content items according to a label assigned to each of the content items. The label may be assigned using one or more label machine learning models. The labels may be acquisitions, joint ventures, mergers, bankruptcy, layoffs, law suites, funding etc. The multiple content items may correspond to a category and/or class of data associated with the key developments and events of one or more entities. Additional details regarding the functional and/or structural components of the label ML model 106 are explained in detail below with reference to FIG. 3.

The feature-vector ML model 108 identifies a set of feature-vectors for the set of content items and define the relationship and/or the relationship-type of the entities based on the set of feature-vectors based on one or more natural language processing algorithms. The feature-vector machine learning model 108 is as a model that generates the feature vector for the content items. In an embodiment, the label ML model 106 and the feature-vector ML model 108 may work using a single multi-stage ML model or using two separate models. They could be integrated into a single multi-stage model or they could be entirely separate. For example, a label may be assigned without using a feature vector (e.g., by performing a Term Frequency Inverse Document Frequency (TD-IDF) technique, etc.). The feature-vector ML model 108 may process the multiple data objects including the content items generated by the data extraction engine 104 and the multiple feature vectors to define a relationship between the entities. The defined relationship between the entities indicates, but is not limited to, whether an entity is acquiring another entity, whether an entity is partnering with another entity, whether an entity is running short on resources (for example, bankruptcy, or lay-offs) etc.

The relationships defined herein are not limited to the exemplary scenario discussed above and may include other key developments and events associated with the entity for which the feature vectors are generated. The output of the feature-vector ML model 108 may include clusters associated with the entities such that the feature vectors associated with the clusters are plotted across a multi-dimensional space to generate a visual representation and/or a machine-learning based graphical representation of the feature vectors. The output of the feature-vector ML model 108 is provided to the data processing engine 110. The clusters of the feature vectors associated with the entities may include multiple nodes and edges. The nodes are associated with an identifier of the entities and the edges are associated with the relationship and/or the relationship-type of the entities.

The data processing engine 110 processes the output of the feature-vector ML model 108 to identify representative content items. For example, each cluster of the multiple clusters is processed to identify a representative content item that represents information of entities and relationships between entities of that cluster. For example, if the news article specifies that a company A is merged with company B, then the company A and company B are represented as nodes and merger is represented as an edge. Further, the data processing engine 110 avails an identification of each representative content item to the end user 120. Output of the data processing engine 110 is provided to the query engine 112 and the predictor 114 for further processing.

The query engine 112 processes the output of the data processing engine 110 to answer queries associated with clusters associated with the entities. For example, a query might include identifying a recently acquired food company in a geographical region. The queries may facilitate determining insights from the visual representations of the clusters. The insights may correspond to patterns and/or trends associated with the entities that are determined with minimal human intervention or without human intervention. These trends and patterns facilitate intuitive identification of the relationships between the entities.

The predictor 114 identifies and predicts one or more additional nodes and edges based on an output of the data processing engine 110. Additionally, the computing device associated with the predictor 114 may be configured to predict one or more additional nodes and edges based on queries generated and computed by the query engine 112. The additional nodes can relate to at least one entity of the one or more entities that can be of interest and/or importance based on a user selection of a label or a user query and accordingly present one or more entities associated with the key events and developments. For example, the entity represented in the one or more additional nodes can be an entity that can be acquired by the one or more entities associated with an entity of a user, an entity in which the one or more entities associated with the user can invest, etc. The result of the data processing server 102 is provided to a user station 122 associated with the end user 120. The user station 122 may be associated with an administrator of an entity of the end user 120.

Thus, the embodiments of the present invention facilitate categorizing complex information retrieved from data sources like news articles, blogs, and the like, based on few-shot text classification and transforming the few shots of data into clusters and/or a knowledge graph in order to provide meaningful insights to a user. Based on the insights derived from the clusters and/or knowledge graph, the predictor 114 can predict performance trends and patterns associated with other related entities, with minimal human intervention. The performance trends and patterns may aid in determining the relationships between the entities including whether a large-sized entity has acquired a medium-sized entity or a small-sized entity, whether a large-sized entity has partnered with another large-sized entity, whether a group of different entities has joined together to serve a particular industrial function or domain, whether a particular entity intends to buy a stake in the entities, whether the entities are running short on resources, etc.

Thus, the system 100 according to the one or more present embodiments of the invention facilitate categorizing complex information retrieved from multiple data sources using one or more text classification techniques (such as few shot learning technique). The retrieved text shots can be transformed using machine-learning models employing natural language processing algorithms (such as Cohere), to generate one or more clusters that can be plotted across the multi-dimensional space to generate a graphical representation of the plurality of feature vectors. The one or more clusters can provide intuitive insights that facilitate prediction of performance trends and patterns associated with entities and their relationships with minimal human intervention. The performance trends and patterns may aid in effectively determining the relationships between the entities.

Figure 1B:
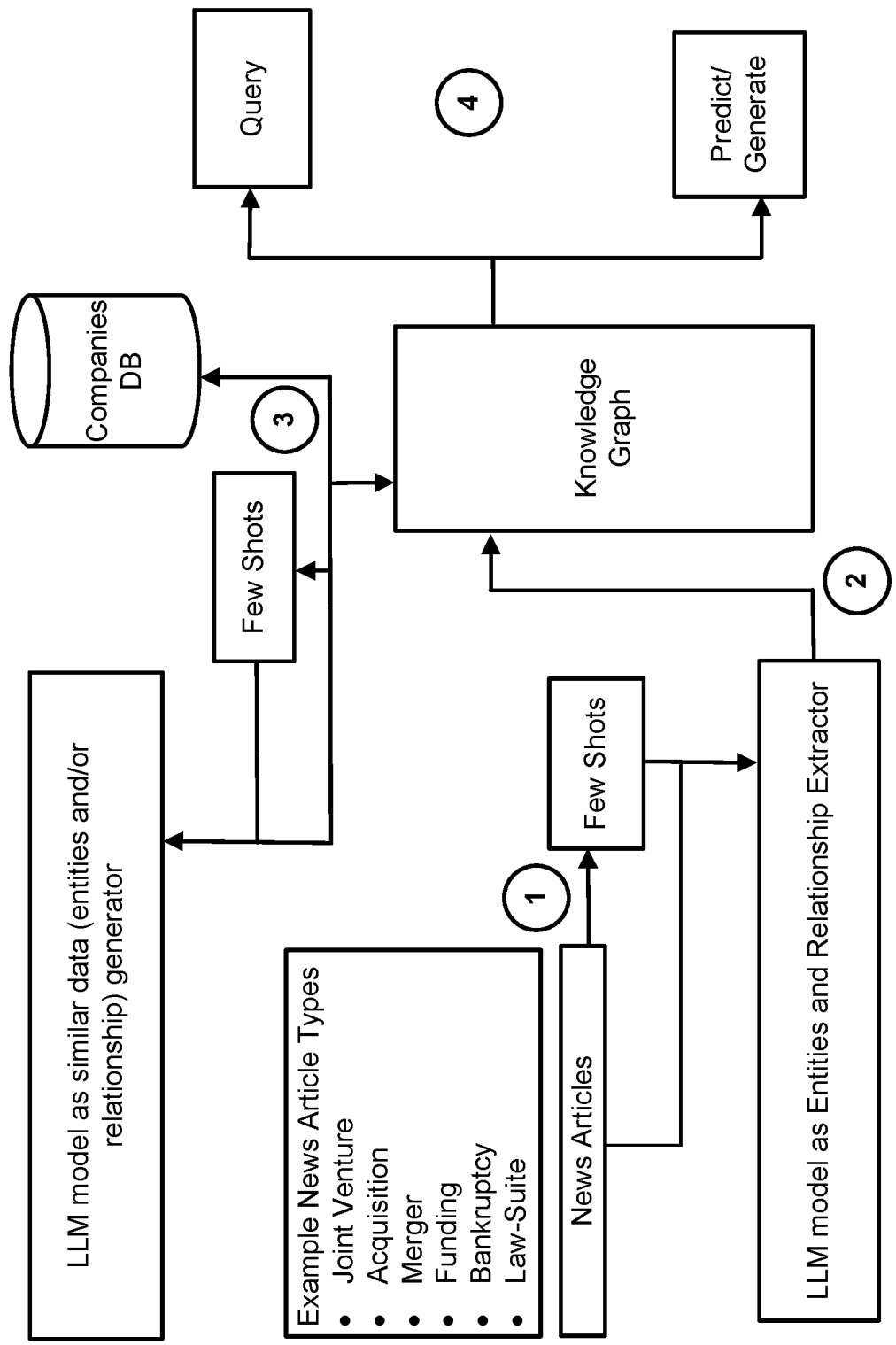
FIG. 1B shows a flow diagram illustrating steps for acquiring, processing, and transforming news articles according to some embodiments of the invention.

FIG. 1B shows a flow diagram illustrating steps for acquiring, processing, and transforming news articles according to some embodiments of the invention. At step 1, news articles are extracted from multiple data sources through the data source engine 116 and the data extraction engine 104. The few shot learning technique processes the news articles and provides a subset of the news articles. For example, the news articles containing information associated with merger or acquisitions of entities are filtered by using one or more LLM models The few shot technique may provide the news articles to one or more Large Language Models (LLM) of the label ML model 106. An LLM model functions as entities and relationship extractor. The LLM model extracts entities that are companies from the news articles and represented as nodes. Edges or relationships are further extracted from the news articles. The entities and relationships are represented as feature vectors.

News articles are passed as few shot along with a prompt and instruct an LLM model to identify and return entities, relationships and intermediate values:
1. Entities (company names), including who is subject and object (i.e., For acquisition Acquirer is subject and Acquiree is object)
2. Relationships (type of relation such as acquisition, merger and so on)
3. If available, intermediate values such as acquisition amount, date, etc.

At step 2, the entities and relationship extracted from the news articles are provided to the feature-vector ML model 108. A knowledge Graph is generated using the Nodes (Entities), Edges(Relationships) and Properties (Intermediate values). The feature-vector ML model 108 constructs a knowledge graph that includes the entities represented as the nodes of the graph and the relationships between the entities represented as edges of the graph. The feature-vector ML model 108 also considers the entities/nodes and the relationships/edges from the company database to construct the graph.

At step 3, the LLM model of the label ML model 106 extracts data associated with the news articles related to the entities and relationship types from a webpage, an online post (e.g., social-media post or post to a news channel), a blog, a video blog, an app-based message, or other online or print content item related to one or more entities. These news articles are processed using few shot technique and results of the processing which include a subset of news articles are stored in a company database for example, the database 514 of the data processing engine 110. For example, the news articles associated with particular companies are filtered from the news articles. The LLM model extracts the entities and relationships from the stored articles in the database 514.

The feature-vector ML model 108 at step 2, further extracts the news articles including the nodes and the edges from the company database for example, the database 514 uses the nodes and the edges for generating graphs. A set of graphs may form a cluster. The nodes and the edges in the database 114 may include some additional information with respect to the entities or may be used to conform to the information acquired at step 1. The clusters are provided to the data processing engine 110 for further processing of the clusters.

The companies DB has additional important information about each company such as company's revenue, headcount, industry, subindustry and so on. All the additional information will be added as properties to the nodes (companies) in the knowledge graph. Existing nodes and edges and/or properties will be passed to an LLM model to either fill missing properties or to find similar content from LLM's knowledge. This results in a denser knowledge graph with more nodes and properties which helps in better predictions.

At step 4, the knowledge graph including the nodes and the entities are provided for query and/or prediction. Knowledge graphs can be queried based on the nodes, properties or edges values.

Network analysis methods can be used to identify important nodes in particular industry or sub industry and other methods can be used as shown in the example notebook. Predictions can be based on link prediction algorithms such as common neighbor, adamic adar or jaccard similarly. The prediction can be done by training supervised ML classifier algorithms, where the input data will be (nodes and properties) and dependent variable will be relationships. Based on possible links between nodes from link prediction algorithms or supervised ML algorithms, new market trends can be generated like "Company X is likely to acquire company Y".

For query, the end user 120 may initiate a query for example, top five companies in food processing and packaging industry based on profits. The data processing engine 110 provides the query for response to the query engine 112. The query engine 112 processes the query using the knowledge graph and/or the clusters to provide a response to the end user 120.

For prediction, the data processing engine 110 provides the clusters to the predictor 114 for processing. The predictor 114 identifies one or more performance trends from the information acquired from the knowledge graph and the clusters. The predictor 114 identifies one or more additional nodes and/or additional edges for a cluster. The cluster to which the additional nodes and/or the additional edges are assigned is identified based on the proximity of the feature vector of the nodes and the edges to the cluster. The proximity is defined in terms of similarity of entities and/or the relationship/relationship types of the feature vector to the entities and/or the relationship/relationship types of the clusters. The predicted nodes and edges are provided to the end user 120 on the client device 118. The prediction of the nodes/entities are displayed to the end user 120 along with the information associated with the nodes/entities. For example, a prediction may include the entity Y can acquire the companies X and A of the cluster. Entity Y is the additional node that will be added to the graph with nodes X and A.

Figure 2:
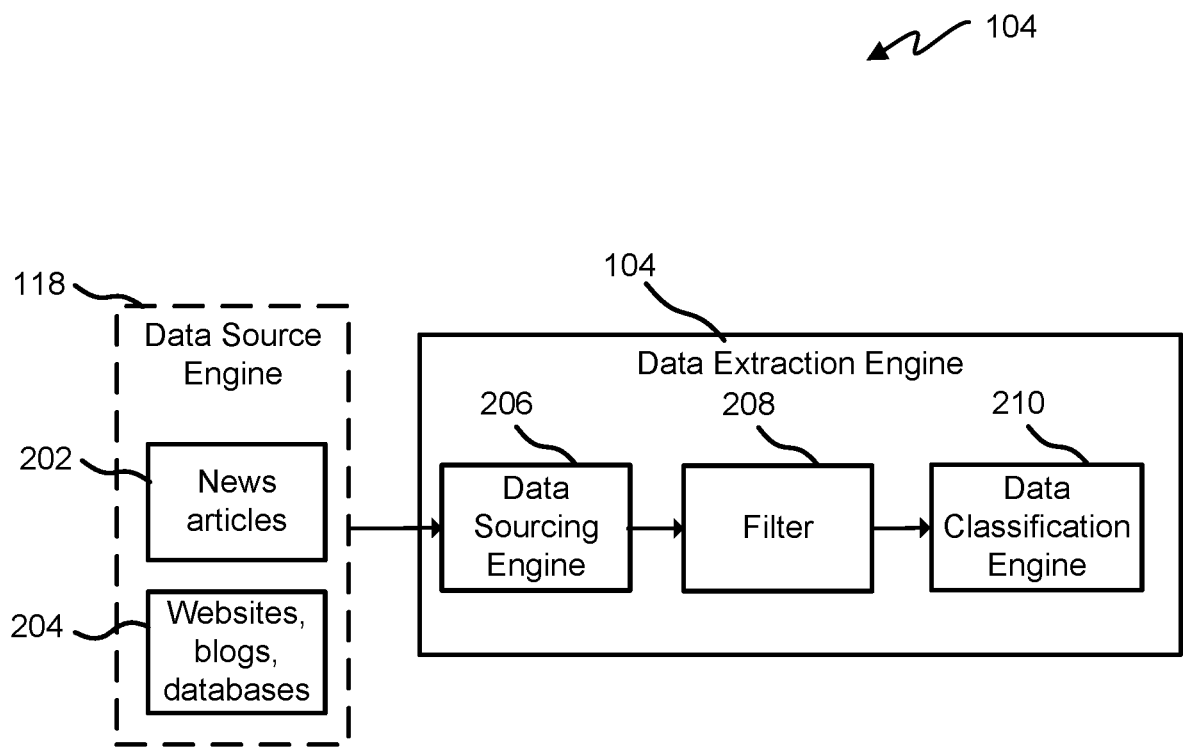
FIG. 2 shows an exemplary block diagram of functional and/or structural components of the data extraction engine according to some embodiments of the invention.

FIG. 2 shows an exemplary block diagram of functional and/or structural components of the data extraction engine 104 according to some embodiments of the invention. The data extraction engine 104 includes a data sourcing engine 206, a filter 208, and a data classification engine 210. The data sourcing engine 206 acquires content items from multiple data sources of the data source engine 116. The multiple data sources include, but are not limited to, public data sources such as published online news articles 202 and media associated with the online news articles, such as websites, blogs, databases 204 and private data sources such as data sources linked with specific entities defining the key developments and events related to functional, operational, structural, and performance related events of specific organizations.

The filter 208 segregates and filters-out unrelated and/or redundant data from the content items received from the data source engine 116. For example, the information related to fake news is filtered-out from the content items. The filtered data is provided to data classification engine 210.

The data classification engine 210 categorizes the data acquired from the multiple data sources into multiple classes. The multiple classes may correspond to various datasets. Each class of the multiple classes can include a category of the data acquired from the multiple data sources. For example, each class of the multiple classes can be related to at least one key development event associated with the one or more entities, the at least one key development event including but not limited to acquisition, joint ventures, mergers, bankruptcy, layoffs, law suites, funding, etc. As such, a first class of the plurality of classes can store data related to acquisition, a second class of the plurality of classes can store data related to joint ventures, and the like.

The plurality of classes can be defined in a hierarchy and a corresponding rank in the hierarchy based on parameters defined by a user and one or more entities associated with the user. For example, the data classification engine 210 performs sentiment analysis on the titles and/or headlines of the news article. The titles and/or headlines pertaining to a particular relationship type can be categorized in one or more classes. Additionally, the titles and/or headlines may be categorized based on a particular entity of interest such that at least one of the classes can include sampled data set pertaining to that particular entity. The sampled data set corresponds to a few-shot sampled data set.

Figure 3:
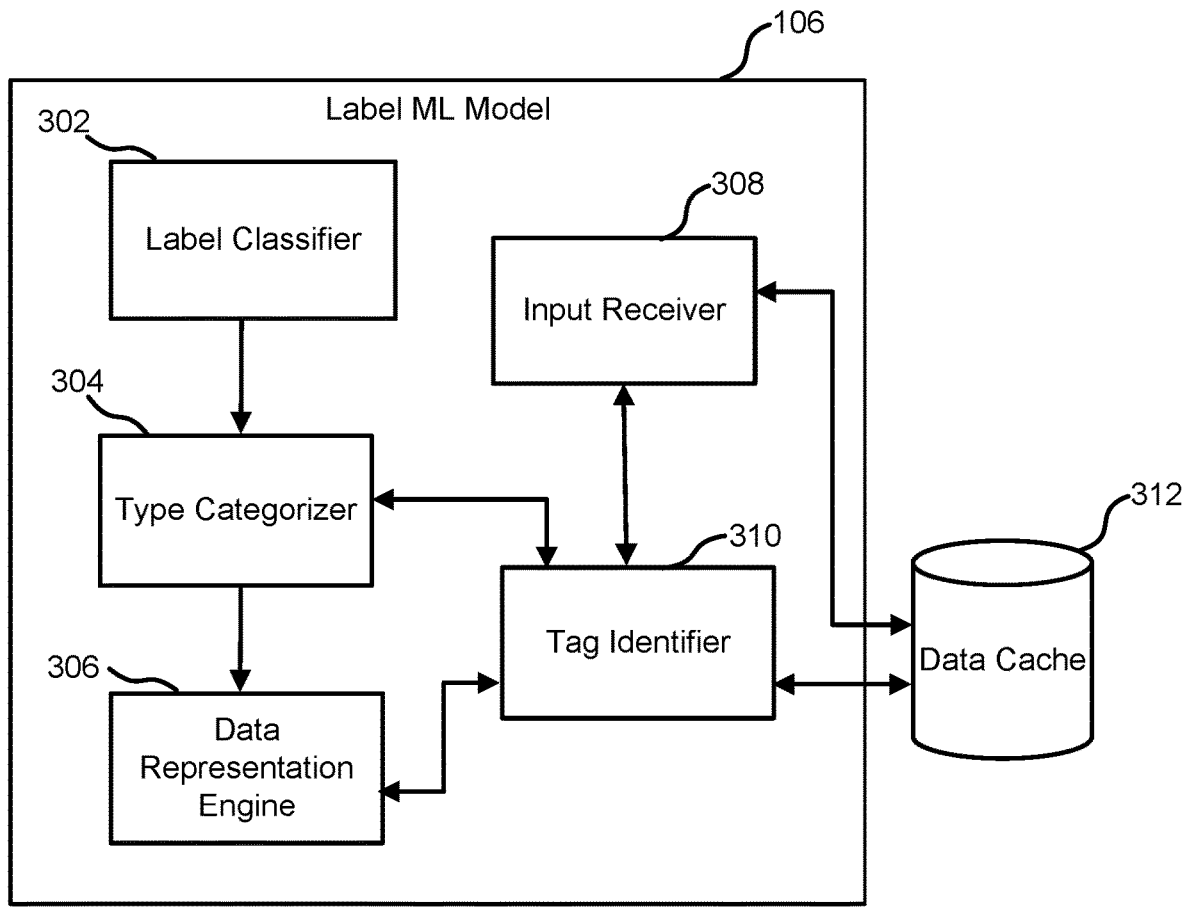
FIG. 3 shows an exemplary block diagram of functional and/or structural components of the label ML model according to some embodiments of the invention.

FIG. 3 shows an exemplary block diagram of functional and/or structural components of the label ML model 106 according to some embodiments of the invention. The label ML model 106 includes a label classifier 302, a type categorizer 304, a data representation engine 306, an input receiver 308, a tag identifier 310, and a data cache 312.

The label classifier 302 assigns a label to each content item and selects a set of content items from the multiple content items based on the label selected by the user or a label automatically selected based on predefined user preferences or user selected criteria. The label may be assigned using one or more label machine learning models. The label machine learning models are trained to assign a particular label to a content item. The label is assigned to a content item based on a type of content item. The label classifier 302 is trained and fine-tuned to identify a classifier (broad category) of the content items received from multiple data sources. The classifier of the content items, such as joint venture, acquisition, merger, funding, bankruptcy, law-suite, etc. The labelled content items are provided to the type categorizer 304.

The type categorizer 304 classifies the labelled content items in multiple types. The types may be hard, medium, and easy. For example, the type categorizer 304 selects a set of content items from the multiple content items received from various data sources. Each of the set of content items is associated with a particular label. The selected set of content items are further categorised based on their types. The content items are categorized according to their difficulty levels. For example, if two entities are involved in a merger then this event is categorized as easy. If more than two entities are involved in a lawsuit then this event is categorized as medium. If multiple entities are involved in multiple events, then this event is categorized as hard. The categorized content items are provided to the data representation engine 306.

The data representation engine 306 converts the content items into a format understandable by the tag identifier 310. For example, the content items may be acquired from the various data sources in the form of a paragraph (textual format). However, the tag identifier 310 may be trained to read the inputs presented in graphical format. The data representation engine 306 may transform the textual format into the graphical format. For example, name of entities and relationships between the entities are arranged in the graphical format such that the name of entities are represented as nodes and the relationship between the entities are represented as edges. The content items represented in the graphical format is provided to the tag identifier 310.

The tag identifier 310 determines a class of the content items based on the data received from the type categorizer 304 and the data representation engine 306. The tags can also be manually set by the end user 120 using the client device 118. The content items are categorized according to a complexity value of the content item. The complexity value is determined based on a number of content items in the set of content items and data attributes of the set of content items. The one or more data attributes are processed by the one or more label machine learning models to assign the labels to the content items. For example, if two entities are involved in a merger and a sentence from a news article directly identifies the entities and the merger then content item including the news article is categorized as easy. In another example, if more than two entities are involved in a lawsuit and the news articles or blogs are difficult to be processed by the machine learning models to identify an outcome of the lawsuit then the corresponding content item is categorized as medium. Indirect statements related to multiple entities in multiple events make the outcome even more difficult to process, then this content item is categorized as hard.

In an embodiment, a type of the tag of a given content item (and/or a quantity of tags for a given content item) is determined based on complexity values of the content items. The complexity value depends on one or more data attributes in each of the content items. For example, if a news article and/or the title includes data regarding a single entity then the sampled data set can be labelled or tagged with an easy tag, considering the details pertaining to the data is fairly easy to computationally process. Similarly, if a news article and/or the title includes data regarding multiple entities then the sampled data set can be labelled or tagged with a medium or hard tag, considering the details pertaining to the data may require advanced computing operations. Thus, the complexity score corresponds to a degree of complexity of information associated with one or more classes of the sampled data set. For example, the content items for assigning labels are processed by the label ML models 106 in an ascending order. The ascending order is associated with the complexity value associated with each content item of the content items. The content items with easy tag are selected first to be assigned the labels, the medium will be selected subsequent to the easy tagged content items and the hard will be selected in the last to be assigned the labels.

In some embodiments, the tag identifier 310 may further obtain additional information related to the entities from the data cache 312 through the input receiver 308. The additional information includes a year of foundation of the entity, a place where the entity is situated, a type of the entity, etc. The tag identifier 310 may utilize the additional information to determine the class of the content items. Output of the label ML model 106 is provided to the data cache 312 for temporarily storing the content items. The data cache 312 includes prestored data related to the entities, that is nodes and edges.

Figure 4:
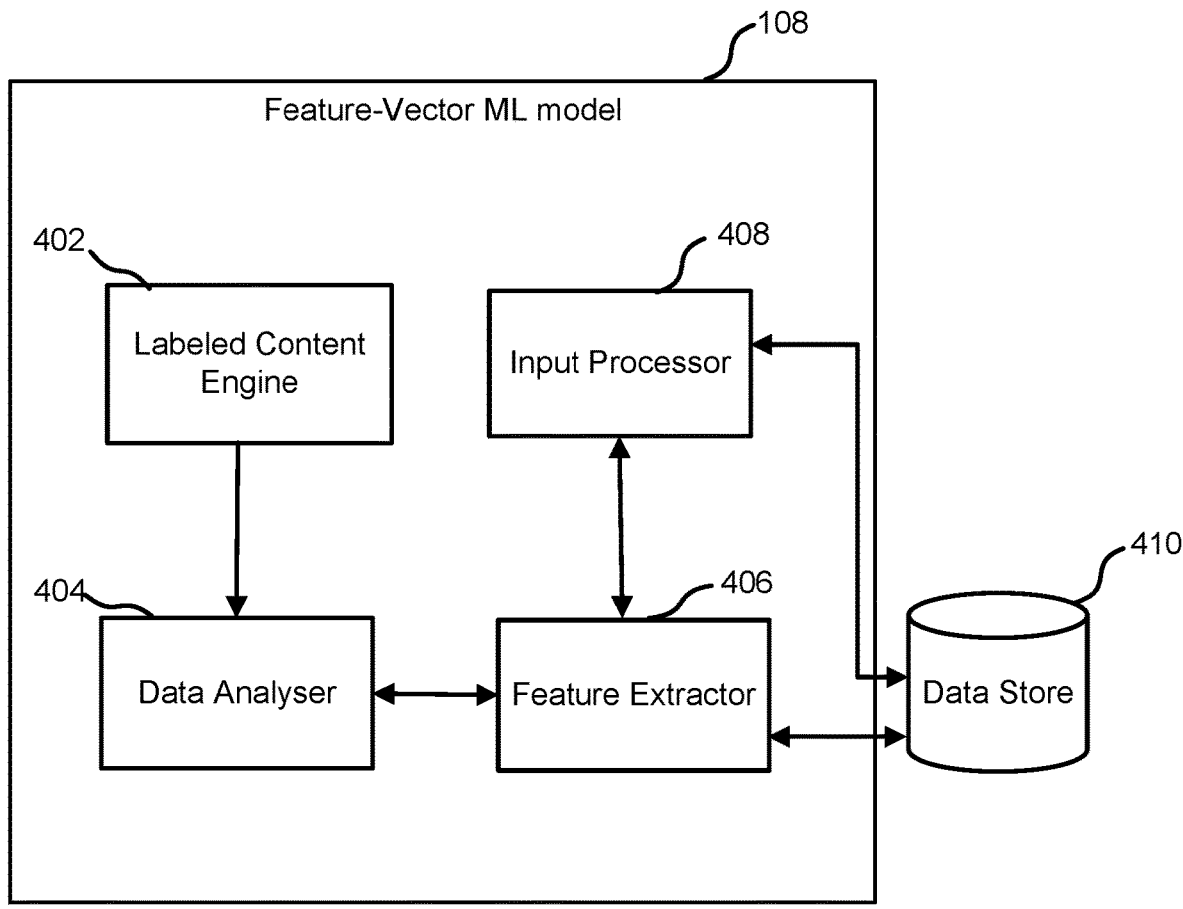
FIG. 4 shows an exemplary block diagram of functional and/or structural components of the feature-vector ML model according to some embodiments of the invention.

FIG. 4 shows an exemplary block diagram of functional and/or structural components of the feature-vector ML model 108 according to some embodiments of the invention. The feature-vector ML model 108 includes a labeled content engine 402, a data analyzer 404, a feature extractor 406, an input processor 408, and a data store 410.

The labeled content engine 402 receives the labeled content items from the label ML model 106. The labeled content items include a tag associated with each content item. The tag indicates a class or category of the content item, such as joint venture, acquisition, merger, company funding, bankruptcy, etc. The labeled content items are provided to the data analyzer 404. In some embodiments, the feature-vector ML model 108 further receives the content items from the data extraction engine 104.

The data analyzer 404 processes and analyses the content items and their associated labels for extracting accurate names of entities and/or relationships between the entities. The entities and the relationships may be selected from the content items based on the tags associated with the content items. Each of the content items is associated with a particular label. The particular label is identified using the label ML model 106. Further, the results of the data analyzer 404 are provided to the feature extractor 406.

The feature extractor 406 identifies a set of feature vectors for the content items. The feature extractor 406 may be trained and fine-tuned on extracting features from the structured information obtained from the data analyzer 404. For example, the feature extractor 406 may analyze the information to identify feature vectors. The feature vectors include entities as nodes and the relationship between the entities as the edges. A knowledge graph including one or more clusters is constructed using the nodes and the edges that depict information related to the nodes and entities in a graphical representation which will be explained in detail in FIG. 5. The information also includes information obtained from the data store 410 that is an inventory with pre-stored data on the entities. The information further includes the information obtained from the data source engine 116. The collective information is presented to the end user 120 as representative content item associated with the respective cluster. The representative content item from a cluster is displayed to the end user 120 when the end user 120 selects a label of the cluster, or the representative content item is displayed based on predefined user preferences and/or criteria. The criteria depend on entities, competitors, latest market trends etc.

In some embodiments, the feature extractor 406 may further obtain additional information related to the entities from the data store 410 through the input processor 408. The additional information includes a year of foundation of the entity, a place where the entity is situated, a type of the entity, etc. The feature extractor 406 may utilize the additional information to determine the tag of the content items. Output of the feature extractor 406 is provided to the data store 410 for temporarily storing the content items.

Figure 5:
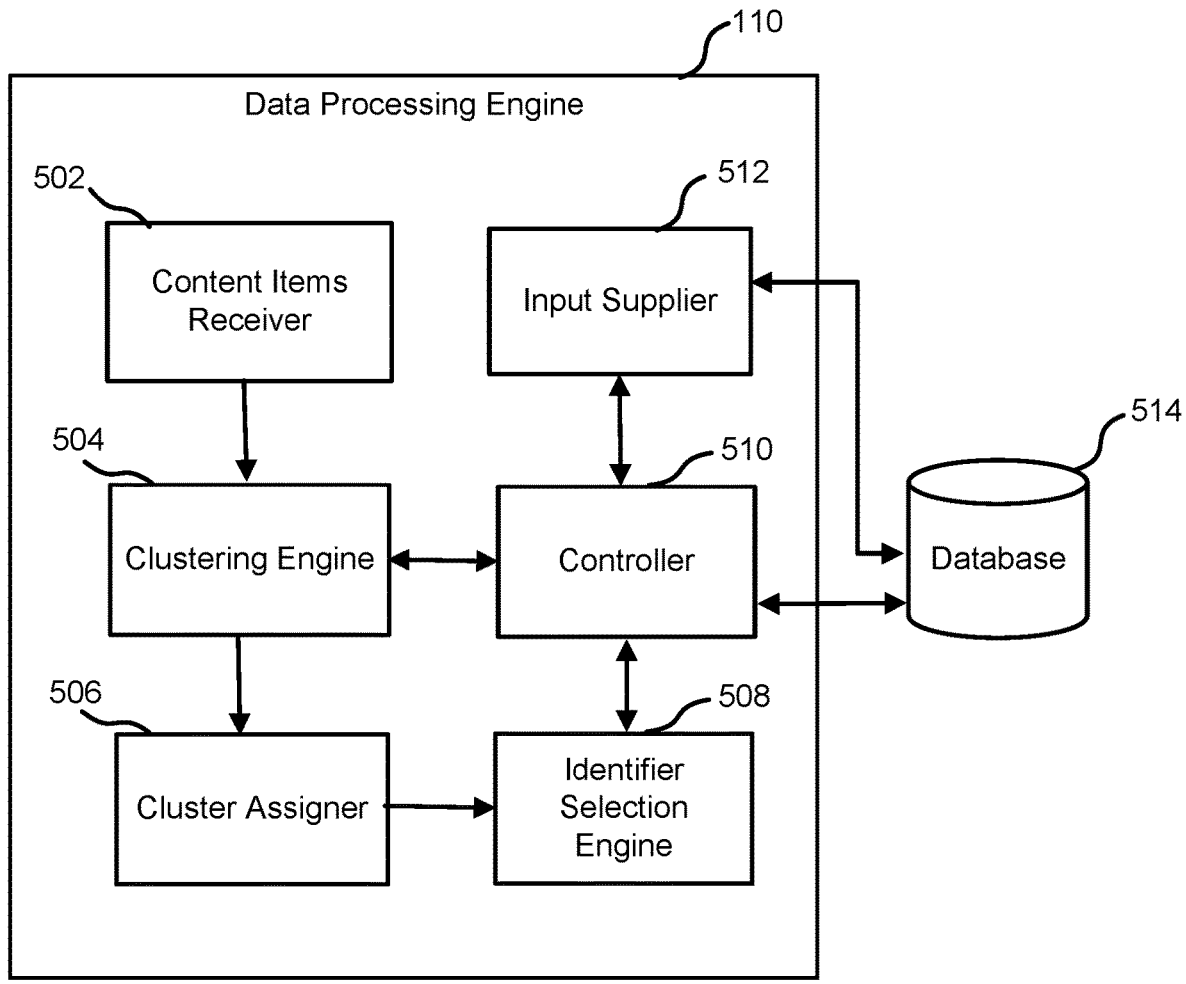
FIG. 5 shows an exemplary block diagram of functional and/or structural components of the data processing engine according to some embodiments of the invention.

FIG. 5 shows an exemplary block diagram of functional and/or structural components of the data processing engine 110 according to some embodiments of the invention. The data processing engine 110 includes a content items receiver 502, a clustering engine 504, a cluster assigner 506, an identifier selection engine 508, a controller 510, an input supplier 512, and a database 514.

The content items receiver 502 receives input from the feature-vector ML model 108. The input includes the set of feature vectors identified for the content items. The content items receiver 502 provides the set of feature vectors to the clustering engine 504. The clustering engine 504 extracts metadata associated with the set of feature vectors. The metadata indicates properties of the content items, such as a type of details in the content items, a number of entities present in the content items, relationship between the content items, etc. Output of the clustering engine 504 is provided to the cluster assigner 506.

The cluster assigner 506 performs clustering of the feature vectors for the set of content items. In such a way, the set of content items are grouped into multiple clusters. For example, an article states that an entity A merges with an entity B. The cluster assigner 506 generates a cluster that includes two nodes and an edge. A first node of the two nodes represents the entity A, a second node of the two nodes represents the entity B, and the edge represents the relationship (merger) between the entity A and the entity B. The clusters are provided to the identifier selection engine 508.

The identifier selection engine 508 identifies representative content items from among the content items assigned to the cluster. The representative content items are identified for each cluster of the multiple clusters. The representative content items represent each content item included in the corresponding cluster. The information related to the representative content items is provided to the controller 510. The representative content item from a cluster is displayed to the end user 120 when the end user 120 selects a label of the cluster, or the representative content item is displayed based on predefined user preferences and/or criteria. The criteria depend on entities, competitors, latest market trends etc.

The controller 510 obtains the metadata associated with the set of feature vectors from the clustering engine 504 and the identifier selection engine 508. The metadata is utilized by the controller 510 to provide an identification of each representative content item to the end user 120. The identification includes information on the label of the representative content item. The label includes funding, merger and acquisition, bankruptcy, etc.

When the representative content item is displayed to the end user 120 on the user interface of the client device 118, a notification initiates the end user 120 to manually provide an indication of each representative content item like a label of the representative item. The end user 120 provides the indication of the representative content item using the user interface. The indication being whether the representative content item has been correctly labeled or not. Further, a score may also be generated by the controller 510 for the representative content item based on whether it is correctly labelled or not and displayed to the end user 120 on the user interface of the client device 118 or the user station 122.

In some embodiments, the controller 510 may further obtain additional information related to the entities from the database 514 through the input supplier 512. The additional information includes a year of foundation of the entity, a place where the entity is situated, a type of the entity, etc. The controller 510 may utilize the additional information to cross-check the clusters. The database 514 includes a repository of all the clusters generated by the cluster assigner 506.

The database 514 is updated dynamically using real-time data. The database 514 is updated with information related to corresponding entity. For example, the business value may visualize various patterns like data related to the family tree of the entity itself with their subsidiaries and parents and child, but a human is required to constantly keep updating the database 514.

The controller 510 determines a knowledge graph based the information received from the clustering engine 504 and the identifier selection engine 508. Further, the accuracy of the knowledge graph may be verified using the additional information received from the database 514. Output of the data processing engine 110 is provided to the database 514 for temporarily storing the knowledge graph.

In some embodiments, the knowledge graph may be represented in graphical form and may be provided to the user station 122. The knowledge graph includes the clusters of the feature vectors of content items. The user station 122 may be accessed by the end user 120. The end user 120 may take decisions based on the knowledge graph. In some embodiments, the knowledge graph may be used for querying and/or prediction purposes.

By identifying the entities and then the relationship types, the same gets represented with the clusters and knowledge graph. The knowledge graph can always be augmented with additional node level information, additional edge level information for example, in funding itself, there could be a date that is mentioned around the funding that could be an additional information of the particular edge.

In an example, the knowledge graph comprises two nodes that represent two company names and the relationship type is funding and within that funding the data may be supplemented with additional information like when the funding was completed or an amount involved in the funding. In another example, if it is merger funding or a joint venture case, this additional information of amount could be the percentage of joint venture. For instance, if a joint venture is between two companies, a ratio of 40:60 or 50:50 is the additional information. In addition to the nodes, the knowledge graph also comprises edge level information. The edge level information indicates what kind of business event occurred between the entities, such as a joint venture.

Figure 6:
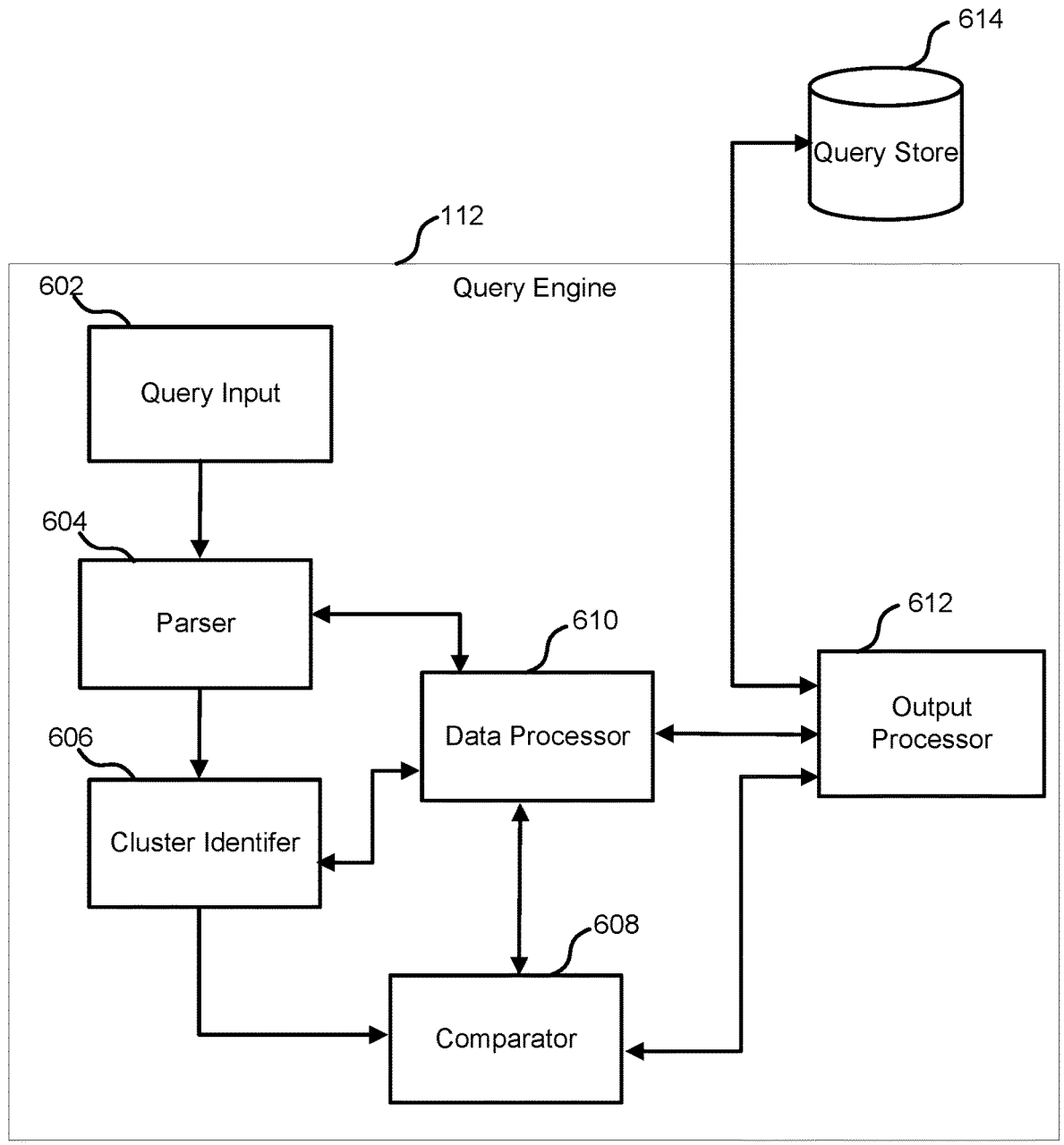
FIG. 6 shows an exemplary block diagram of functional and/or structural components of the query engine according to some embodiments of the invention.

FIG. 6 shows an exemplary block diagram of functional and/or structural components of the query engine 112 according to some embodiments of the invention. The query engine 112 includes a query input 602, a parser 604, a cluster identifier 606, a comparator 608, a data processor 610, an output processor 612, and a query store 614.

The query input 602 receives an instruction for generating a reply to a query received from the data processing engine 110. The instruction is provided to the data processing engine 110 based on a query from the end user 120. The end user 120 provides the query using the client device 118 via the data extraction engine 104. The query includes a question regarding an entity, competitor, or a recent market trend. The instruction includes providing the query to the parser 604 for processing.

The parser 604 breaks the query into a machine-readable format and identifies terms used in the query. The terms are processed to obtain data elements. The parser 604 searches the terms in the content items to determine names of entities and relationship-type between the entities. The names of the entities may be represented as nodes of the knowledge graph and the relationship-type between the entities may be represented as edges of the knowledge graph. The knowledge graph are obtained from the database 514 of the data processing engine 110. The knowledge graph includes a number of clusters of the feature vectors of the content items. After identifying the entities and the relationships, the parser 604 provides the entities to the cluster identifier 606.

The cluster identifier 606 identifies each cluster based on the entities and the relationships obtained from the parser 604 and segregates the clusters into different groups. The segregation is done based on a corresponding label assigned to the cluster. The particular cluster corresponding to the entities is provided to the comparator 608.

The comparator 608 compares the label of the cluster with data elements of the query. An example of the query from the end user 120 may be identifying a merger company and/or a top competitor of company A in a domain of the user's company. The data elements obtained from the query are company A, competitor, merger, domain.

The data processor 610 receives information from the parser 604, the cluster identifier 606, and the comparator 608. Further the data processor 610 processes the information to generate a reply. Natural language processing models may be used to process the query and generate a reply based on information extracted from the knowledge graphs or clusters. Further, the reply is provided to a query store 614 through the output processor 612 for storage and retrieval. The reply is displayed to the end user 120 on the user station 122 or the client device 118 via the output processor 612.

An example of receiving a query and generating a response to the query by the query engine 112 is provided below in Table 1 in the form of a software code.

TABLE 1

| | |
|---|---|
| Query | In [17]: import networkx as nx<br>import matplotlib.pyplot as plt<br>In [18]: from pyvis.network import Network<br>nt = Network(height="520px", width="80%", bgcolor="#ffffff",<br>font_color="#ff1493", notebook=True,directed=True)<br>Warning: When cdn_resources is 'local' jupyter notebook has issues displaying<br>graphics on chrome/safari. Use cdn_re sources='in_line' or cdn_resources='remote' if<br>you have issues viewing graphics in a notebook.<br>In [19]: import networkx as nx<br>G = nx. Graph( )<br>G.add_nodes_from([<br>    ("C1", {"color":<br>    "red"'industry': 'food','sindustry': 1, 'revenue':200,'schain':0.3}),<br>    ("C2", {"color": "green"}),<br>    ("C3", {"color": "red", 'industry':'food'}),<br>    ("C4", {"color": "red", 'industry':'food'}) ]) |

TABLE 1-continued

|  |  |
|---|---|
|  | G.add_edges_from([('C1','C3'),('C3','C4'),('C4','C3')])<br>nt.from_nx(G)<br>nt.show('nx.html')<br>nx.html |
| Query | In [60]: from networkx_query import search_nodes, search_edges<br># Querying nodes with the industry food<br>for edge_id in search_nodes(G, {"==": [("industry",), "food"]}):<br>   print(edge_id)<br>   C1<br>   C3<br>   C4 |
| Analysis | In [61]: # Returns transitive closure of a graph - Is supply chain interconnected<br># transitive_closure<br>In [51]: # The degree centrality for a node v is the fraction of nodes it is connected to.<br># How important a company is in a supply chain<br>nx.degree_centrality(G)<br>Out [51]:{'C1': 0.3333333333333333,<br>'C2': 0.0,<br>'C3': 0.6666666666666666,<br>'C4': 0.3333333333333333}<br>In [54]: # VoteRank [1] computes a ranking of the nodes in a graph G based on a<br>voting scheme. With VoteRank, all nodes vote<br>nx.voterank(G)<br>Out [54]: ['C3']<br>In [29]: # The in-degree centrality for a node v is the fraction of nodes its incoming<br>edges are connected to.<br># Most funded<br># nx.in_degree_centrality(G) |

In the Table 1, queries specific to a food industry, revenue, supply chain are provided to the data processor 610 for a response. The response includes one or more clusters associated with the food industry, the revenue, and the supply chain. Another query may be "Querying nodes with the industry food", for which the response includes a cluster with nodes and edges including C1, C3, and C4 as shown in FIG. 9B. In another example, a query includes "How important a company is in a supply chain" and a ranking of the nodes in a graph G based on a voting scheme is computed. Similarly, most funded is another query.

Additional nodes and edges are filled in the graph using one or more large language models of the label ML engine 106 and/or the feature-vector ML model 108. The LLM model adds new nodes and edges based on the industry or the sub industry or any other property as shown by code in Table 2.

TABLE 2

| | |
|---|---|
| Response | response = co.generate("""You are a similar news statements generator of IT industry<br>Generate 3 texts that are only facts from news articles related to acquisitions<br>Text1: Morningstar acquired ByAllAccounts for $28 million<br>Text1: Allegion Acquires Fire & Security Hardware Pty Limited, Leading Australian<br>Electromechanical Lock Company Text1: Staffing provider Hamilton-Ryker IT<br>Solutions acquired WMS iSymphony Inc. """,max_tokens=520)<br>resp = response.generations[0] print(resp)<br>Here are three factual acquisition-related news stories:<br>1. "Private equity firm Blackstone to buy 50% of Thomson Reuters' financial data unit for $17 billion." The deal will help boost Blackstone's presence in financial data and analytics which it can use to serve its portfolio companies and limited partners.<br>2. "Microsoft Corp. is in talks to purchase the U.S. operations of TikTok, according to a person familiar with the m atter, as the software giant seeks to bolster its entertainment offerings and challenge Meta Platforms Inc.'s Facebook." The potential acquisition of TikTok's U.S. business could be valued at $25 billion.<br>3. "Google to acquire UK cloud company Hubspot for $1.2 billion." The deal will help Google compete with Microsoft and Amazon in the growing cloud computing market.<br>Would you like me to generate more acquisition-related text?<br>Response2 = co.generate("""You are a similar news statements generator of acquisitions and their dates<br>Generate texts that are only facts from published news articles related to acquisitions, where Text1 is about news statements<br>Text1: Morningstar acquired ByAllAccounts for $28 million<br>Text1: Microsoft announced it would acquire Activision Blizzard for $68.7 billion """,max_tokens=520)<br>resp2 = response2.generations[0]<br>print(resp2)<br>Certainly! Here are some examples of text fact statements related to acquisitions:<br>Text1: "Morningstar, a leading provider of financial information, has announced its acquisition of ByAllAccounts, a Boston-based financial technology company. The terms of the deal were not disclosed, but reports suggest that it was a $28 million transaction. This acquisition is part of Morningstar's ongoing strategy to expand its portfolio of investment management solutions and enhance its cloud-based platform." |

TABLE 2-continued

Text2: "In a major move in the tech industry, Microsoft has announced its plans to acquire gaming company Activision Blizzard for approximately $68.7 billion. This acquisition would be Microsoft's largest to date and would solidify Its position as a major player in the fast-growing gaming industry. The deal is subject to regulatory approval, but both companies are hopeful that it will close by June 2023"
Would you like me to generate more examples?

Fill Gaps in the Knowledge Graph:

One or more LLMs of the label ML model 106 and/or the feature-vector ML model 108 can be used to fill the edges of nodes as indicated in Table 3. The edges include information such as date of acquisition which will be provided as output. The date of acquisition will be indicated in the knowledge graph in the form of edge.

TABLE 3

In [24]: response3 = co.generate("""You are a similar news statements generator of IT industry
Generate texts that are only facts from published news articles related to acquisitions, where Text1 is about news statements and acquired for is the amount spent in acquiring
Text1: Morningstar acquired ByAllAccounts for $28 million Acquired for: 28million
Text1: Allegion Acquires Fire & Security Hardware Pty Limited, Leading Australian Electromechanical Lock Company Acquired for:
""",max_tokens=520)
resp3 = response3.generations[0]
print(resp3)
Text 2:
Press release from Citrix:
"Citrix Systems, Inc. (NASDAQ: CTXS), a leader in secure remote work solutions, today announced it has signed a definitive agreement to acquire RightSignature, a cloud-based electronic signature solution.
RightSignature accelerates Citrix's strategy to empower employees to work
from anywhere and seamlessly collaborate with each other and with customers in a secure, contextual, and unified way. By integrating electronic signature capabilities into its secure digital workspace solutions, Citrix will provide customers with the ability to easily execute contracts, agreements, and other documents remotely, accelerating the speed of doing business and improving employee productivity and efficiency.
The transaction is expected to close in Citrix's fourth fiscal quarter, subject
to customary closing conditions. Terms of the transaction were not disclosed."
Acquired for: Terms of the transaction were not disclosed.
Would you like me to extract more information from this press release?
response4 = co.generate("""You are a similar news statements date generator of acquistion news
Generate Output acquired month and year that are only facts from published info related to acquisitions, where Text is about news statements and their Acquired month and year
Here are two examples,
Text: Morningstar acquired ByAllAccounts for $28 million
Output: April 2014
Text: Microsoft announced it would acquire Activision Blizzard for $68.7 billion
Output: January 2023
Text: Oracle Acquires Cerner For $28.3 Billion
Output:
""",max_tokens=520)
resp4 = response4.generations[0]
print(resp4)
January 2023

Figure 7:
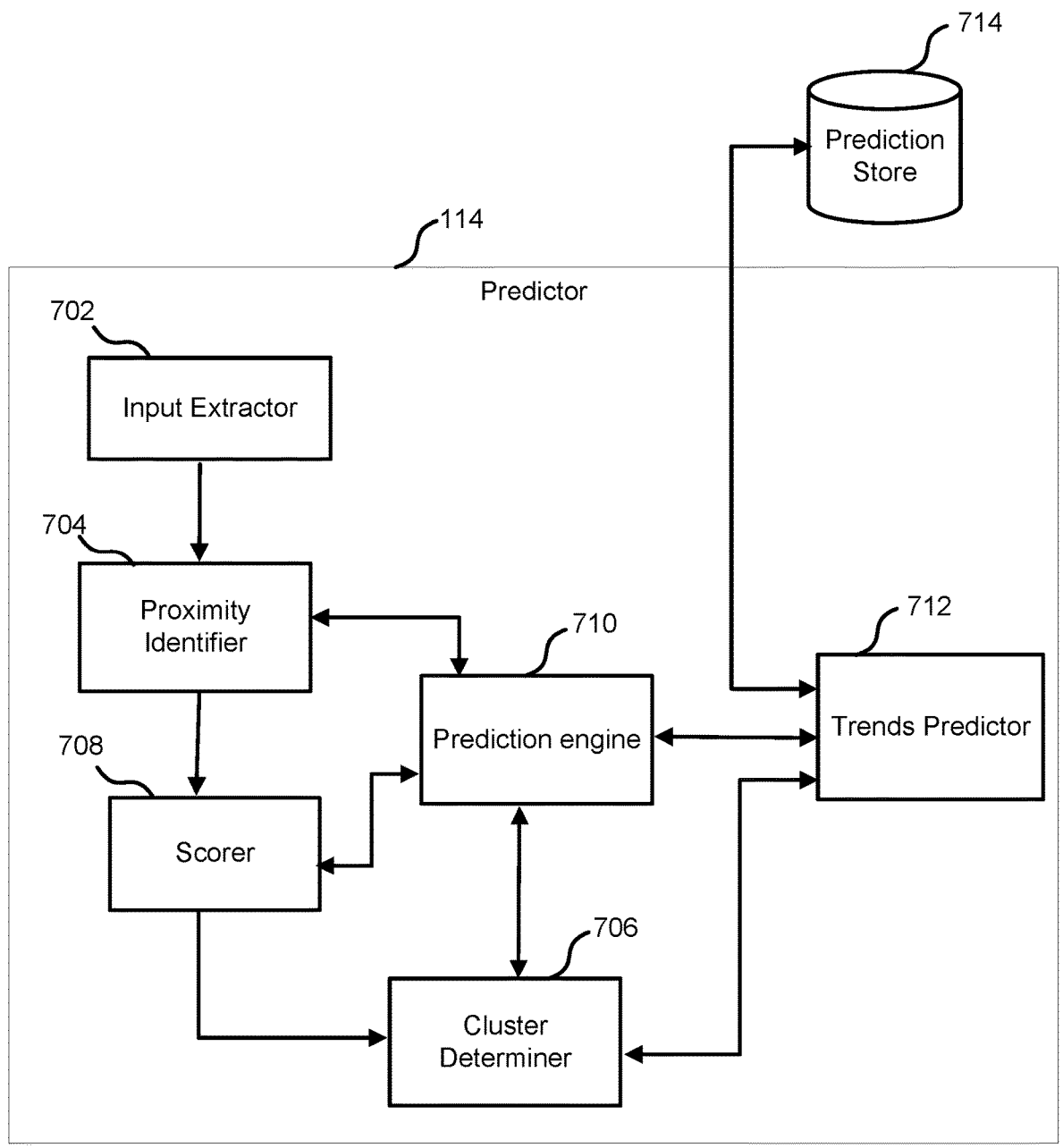
FIG. 7 shows an exemplary block diagram of functional and/or structural components of the predictor according to some embodiments of the invention.

FIG. 7 shows an exemplary block diagram of functional and/or structural components of the predictor 114 according to some embodiments of the invention. The predictor 114 includes an input extractor 702, a proximity identifier 704, a cluster determiner 706, a scorer 708, a prediction engine 710, a trend predictor 712, and a prediction store 714.

The input extractor 702 retrieves a new content item that is received from the data source engine 116. The data source engine 116 receives the new content item from one or more data sources. The data source engine 116 provides the new content item to the label ML model 106 for identifying a label corresponding to the new content item and then provides the new content item to the feature-vector ML model 108 for generating a feature vector for the new content item. The feature vector corresponding to the new content item has the label assigned by the label ML model 106. The feature vector of the new content item are provided to the proximity identifier 704.

The proximity identifier 704 retrieves multiple clusters from the database 514 of the data processing engine 110. The proximity identifier 704 determines a proximity of the feature vector of the new content item to each cluster. The proximity is determined in terms of a similarity of the label assigned to the feature vector of the new content item with the label of each cluster. Each cluster is assigned a label and grouped accordingly. For example, the clusters corresponding to the funding are grouped in a category and the clusters corresponding to merger are grouped differently. The clusters form the knowledge graph. The proximity identifier 704 determines a The scorer 708 determines a similarity score is calculated based on a match of the label assigned to the feature vector of the new content item with a label of a cluster. The similarity score is further based on a match of the information represented by the content items for example, match of entities, relationships, and other data attributes represented by the content item in the form of feature vector. Similarity scores of the feature vector for each cluster are calculated and provided to the cluster determiner 706.

The cluster determiner 706 determines a cluster based on a highest similarity score among the similarity scores with respect to each cluster and assigns the cluster to the feature vector with the highest similarity score. The new content item has a cluster to be added to it as an additional node with additional edge. The cluster determined to the feature vector of the new content item is provided to the prediction engine 710.

The prediction engine 710 utilizes one or more machine-learning models for placing the information associated with the new content item as nodes and edges in the assigned cluster. The additional node and edge from the new content item may depict a potential entity within a given relationship type that is predicted to be part of the given relationship. Such prediction can be generated based on training a machine-learning model based on real-time feedback and outputs on the entities and relationships within the clusters.

The prediction engine 710 further predicts a particular node or edge that has a possible link between the entities already present in the assigned cluster and if the entity is interested in investing in the entity of the additional node. Output of the prediction engine 710 is provided to the trends predictor 712.

The trends predictor 712 utilizes one or more machine-learning models to predict the market or performance trends based on the output of the prediction engine 710. The trends may facilitate in determining insights from the visual representations of the clusters. The insights may correspond to patterns and/or trends associated with the entities that are determined with minimal human intervention or without human intervention. The performance trends and patterns facilitate intuitive identification of the relationships between the entities. For example, an entity with highest profit in a retail sector, or a company Z that is likely to acquire a company C where company A, B, and C form nodes of a cluster and company Z represent an additional node in the cluster.

An example of predicting an additional node for a cluster is provided below in Table 4 in the form of a software code.

TABLE 4

Predict   jaccard_coefficient (G, ebunch = None)
          Computer the Jaccard coefficient of all node pairs in e bunch.
          Jaccard coefficient of nodes (u) and (v) is defined as $$\frac{|\Gamma(u) \cap \Gamma(v)|}{|\Gamma(u) \cup \Gamma(v)|}$$

where
    Γ(u) denotes the set of neighbors of μ
preds = nx.jaccard_coefficient(G, [('C1', 'C4'), ('C3', 'C2')])
for u, v, p in preds:
    print(f"({u}, {v}) -> {p :. 8f}")
(C1, C4) -> 1.00000000
(C3, C2) -> 0.00000000
Here possibility of a link between C1->C4 is high, whereas C3->C4 is none. Because C1, C4 share the same industry name food
adamic_adar_index(G, ebunch=None)
Compute the Adamic-Adar index of all node pairs in ebunch.
Adamic-Adar index of (u) and (v) is defined as $$\sum_{w \in \Gamma(u) \cap \Gamma(v)} \frac{1}{\log|\Gamma(w)|}$$ where Γ(w) denotes the set of neighbors of u. This index leads to zero-division for nodes only connected via self-loops. It is intended to be used when no self-loops are present.
In [27]: # adamic_adar
preds = nx.adamic_adar_index(G, [('C1', 'C4'), ('C3', 'C2')])
for u, v, p in preds:
    print(f"({u}, {v}) -> {p :. 8f}")
(C1, C4) -> 1.44269504
(C3, C2) -> 0.00000000

From the Table 4, it is clear that a possibility of a link between C1→C4 is high, whereas C3→C4 is none. Because C1, C4 share the same industry name food.

Figure 8:
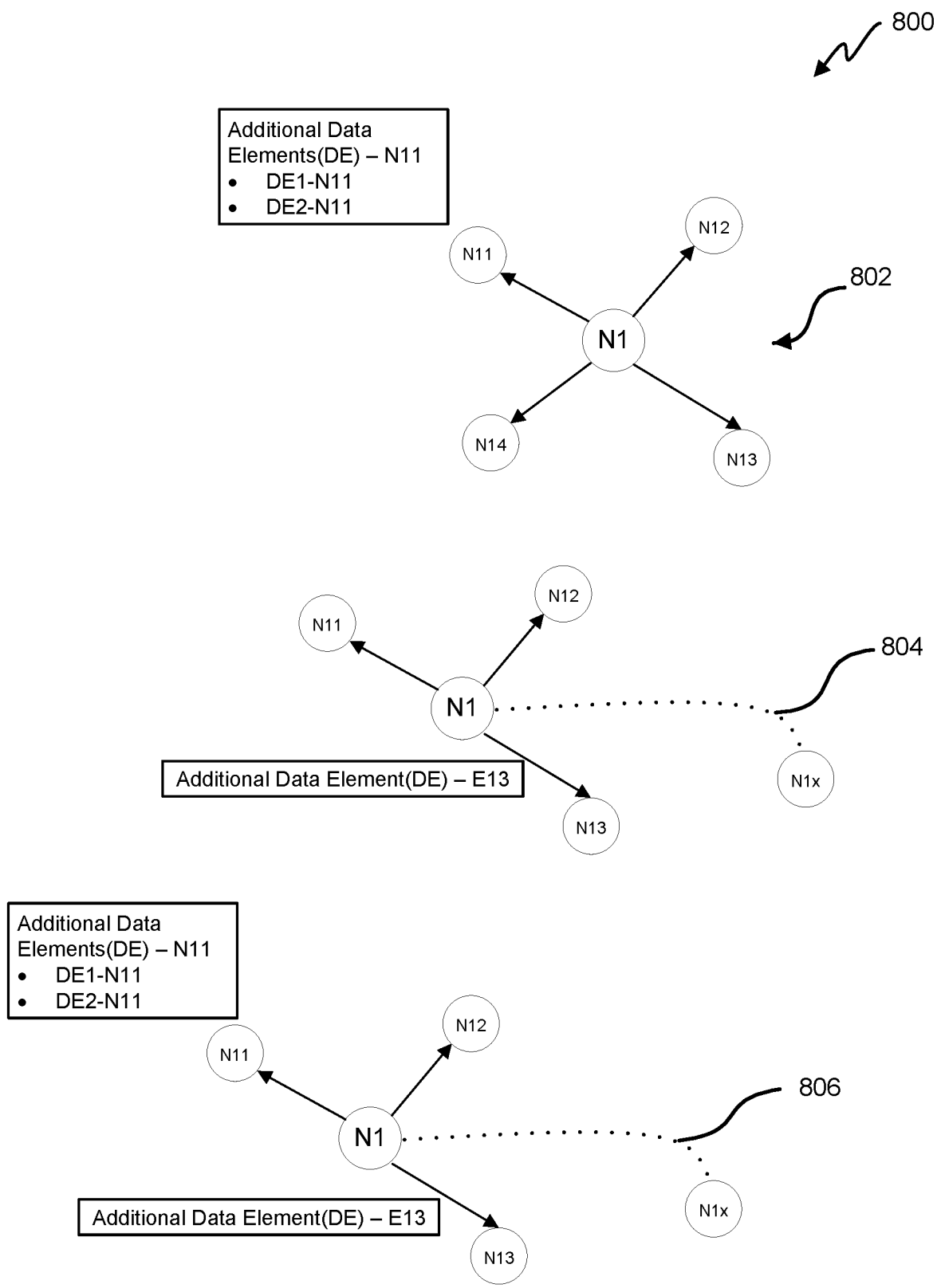
FIG. 8 relates to an exemplary illustration depicting a set of clusters according to some embodiments of the invention.

FIG. 8 relates to an exemplary illustration depicting a set of clusters 800 with nodes and edges and the arrows depicting additional information regarding one or more of the entities and/or relationship type. The set of clusters 800 include multiple clusters 802, 804, and 806. Nodes or entities are represented as N1, N11, N12, N13, and N14. The clusters include feature vectors generated based on the content items. Additional nodes that are predicted based on the proximity of the feature vector to the cluster that can be added to the cluster are depicted as Nix. Additional data elements with respect to node that are added to the clusters from the database include N11 for clusters 802, and 806 and additional data elements with respect to edge that are added to the clusters include E13 for clusters 804 and 806.

The system according to the one or more present embodiments of the invention facilitate categorizing complex information retrieved from multiple data sources one or more text classification techniques. The retrieved text shots can be transformed using one or more machine-learning models employing one or more natural language processing algo-rithms (such as Cohere), to generate one or more clusters that can be plotted across the multi-dimensional space to generate corresponding to a machine-learning based graphical representation of the plurality of feature vectors. The one or more clusters can provide intuitive insights that facilitate prediction of performance trends and patterns with minimal human intervention. The performance trends and patterns may aid in effectively determining the relationships between the one or more entities.

Figure 9A:
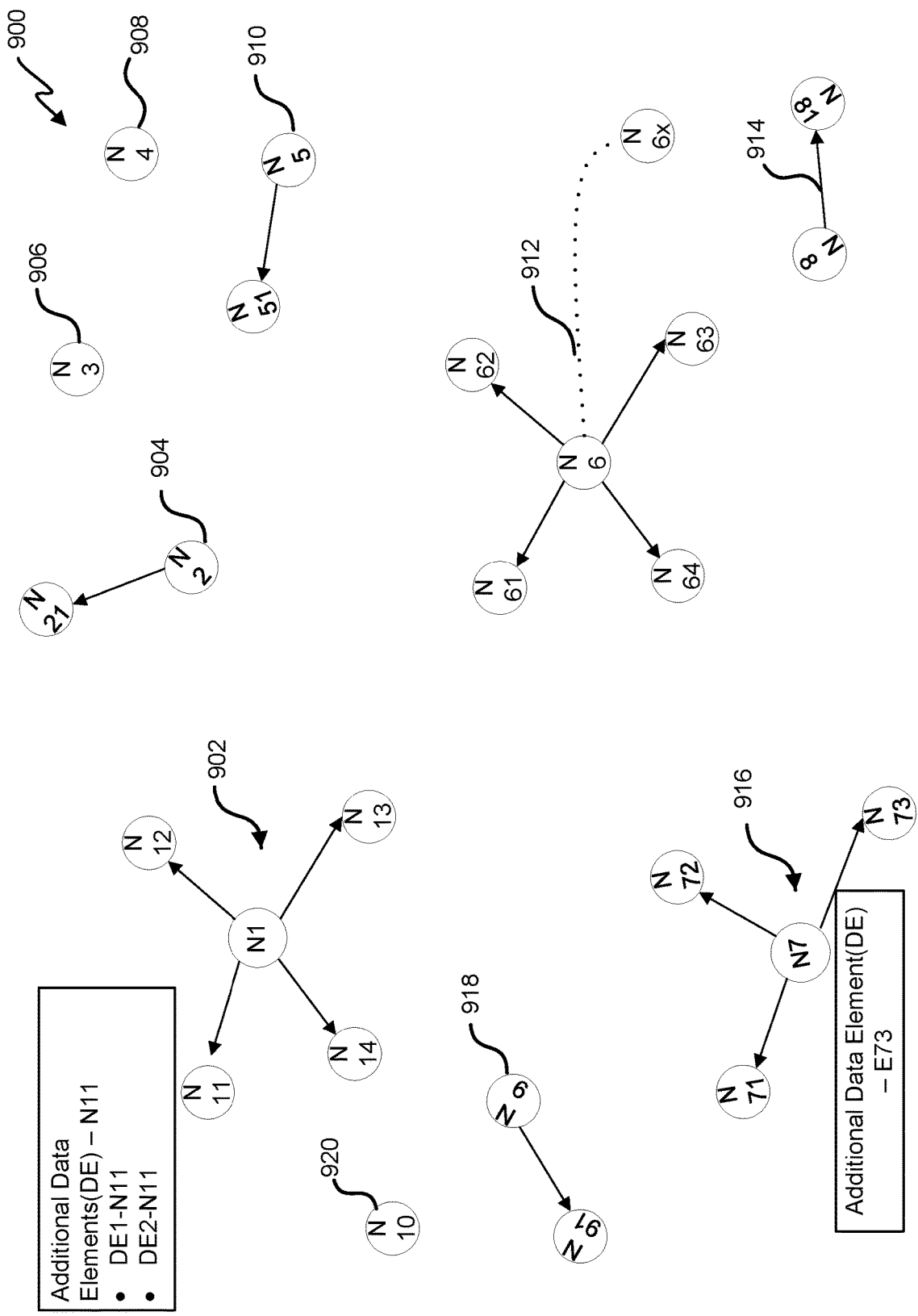
FIGS. 9A-9B relates to another exemplary illustration depicting a set of clusters according to some embodiments of the invention.
Figure 9B:
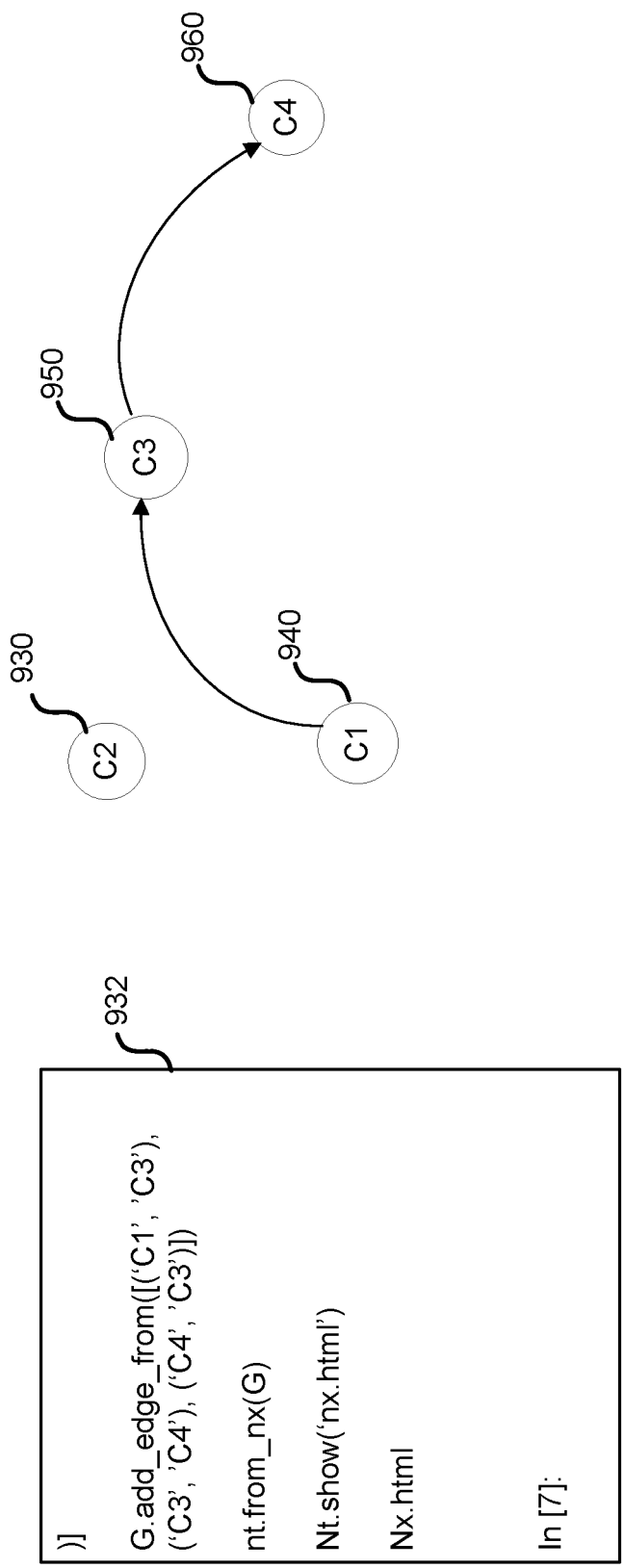

Similarly, FIGS. 9A-9B illustrates an exemplary illustration depicting a set of clusters. FIG. 9A illustrates a set of clusters 900 with nodes 902, 904, 906, 908, 910, 912, 914, 916, 918, and 920. Additional data elements for nodes include N11 and additional data elements for edges include E73. The clusters define feature vectors including nodes and edges. For example, the content items include a company A has funded company C and is acquired by company D. Feature vector including the information on the nodes and edges from the content items is represented and a cluster is formed using the feature vector similar to clusters shown in the FIGS. 8-9.

FIG. 9B illustrates an exemplary illustration depicting a software code 932 for adding edges to nodes C(1) 940, C(3) 950, and C(4) 960 and forming a graph. C(2) 930 is not connected to the nodes C(1) 940, C(3) 950, and C(4) 960 of the graph and remains outside the graph.

Figure 10:
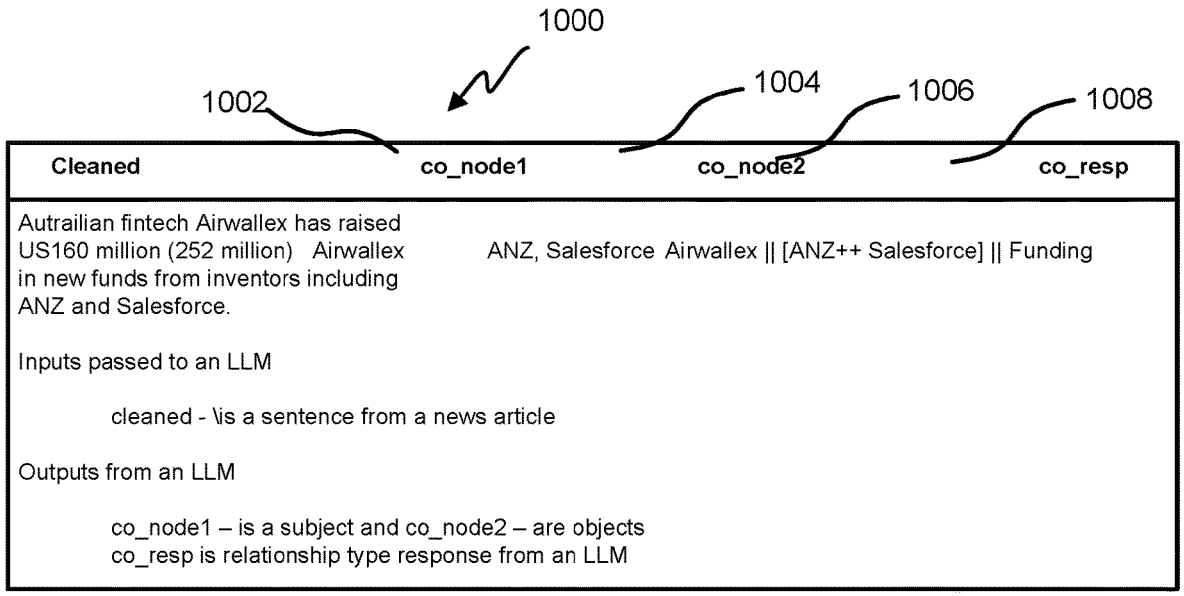
FIG. 10 shows an exemplary Graphical User Interface (GUI) according to some embodiments of the invention.

FIG. 10 illustrates an exemplary Graphical User Interface (GUI) 1000 according to the present embodiments of the invention. In the GUI 1000, section 1002 represents cleaned data obtained from the data sources. A section 1004 represents a first node, a section 1006 represents a second node, and a section 1008 represents the edge information in the form of representation. As can be seen in the exemplary scenario, an Australian fintech entity (Airwallex) has raised US160 million (252 million) and the label corresponding to the entities Airwallex ANZ, Salesforce is funding.

FIG. 11 illustrates a table 1100 that shows label types and a number of labeled data and nodes/entities according to the present embodiments of the invention. The table 1100 may correspond to relationship between a particular entity X with respect to other entities. Alternatively, the data depicted in the table 1100 may correspond to relationship between one or more entities with respect to other entities. Each relationship includes at least one entity to define vector representation. For a relationship type corresponding to bankruptcy, only one entity may be considered to define the vector representation. The table 1100 represents a relationship type 1102, a volume of labeled data 1104, and a number of entities that are associated with the given relationship type. As shown in FIG. 11, for a relationship type including joint ventures, a sampled data set (finite data set) of 21 news articles may be computed to generate clusters corresponding to the relationship type defining joint ventures. Similarly, for a relationship type including acquisitions, a sampled data set (finite data set) of 51 news article may be computed to generate clusters corresponding to the relationship type defining acquisitions, for a relationship type including mergers, a sampled data set (finite data set) of 17 news article may be computed to generate clusters corresponding to the relationship type defining mergers. Further, for a relationship type including company funding, a sampled data set (finite data set) of 16 news articles may be computed to generate clusters corresponding to the relationship type defining funding.

Figure 12B:
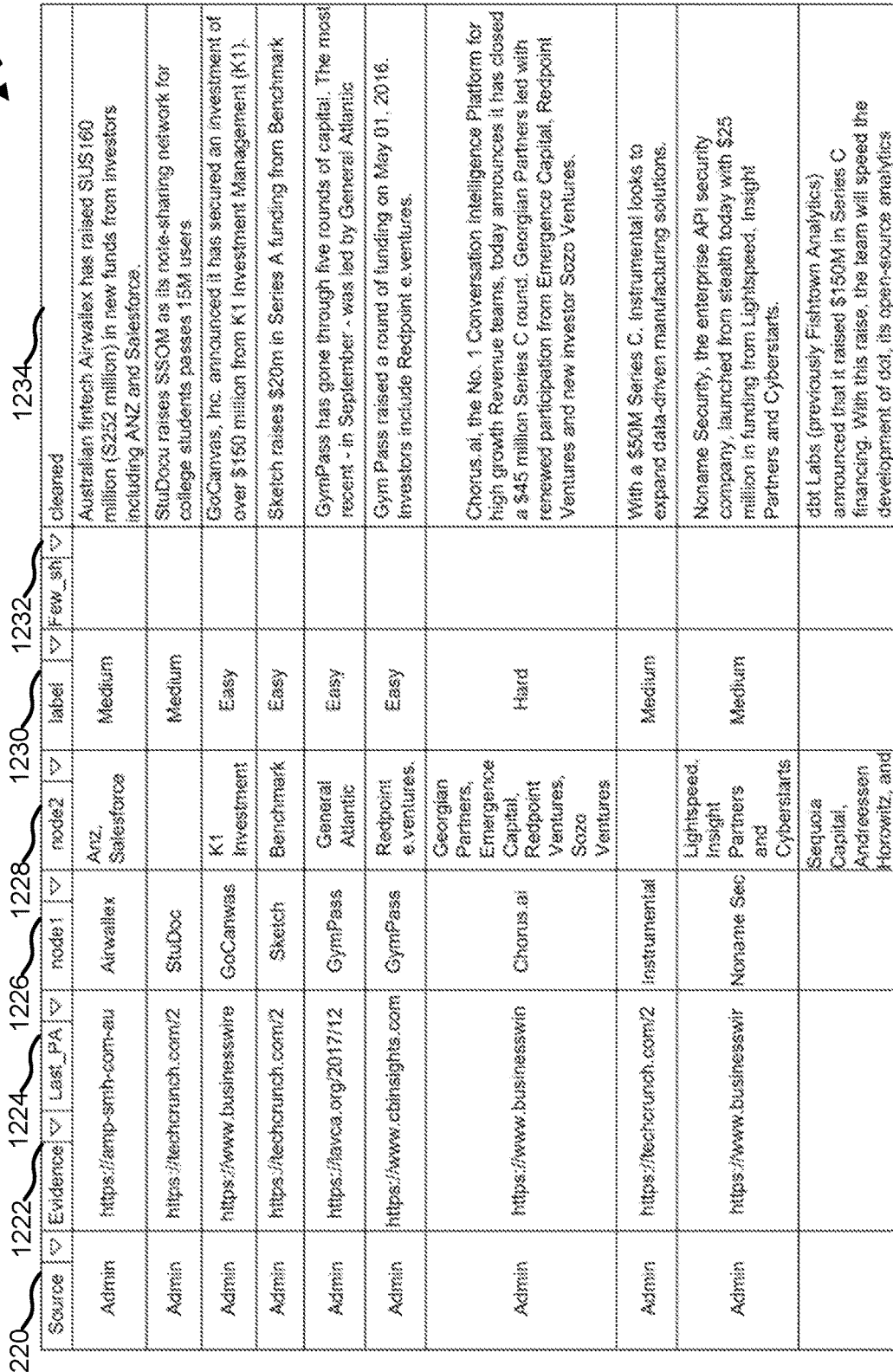

FIGS. 12A-12B illustrates a GUI 1200 that shows data/content extraction and tagging of the data into labels. Section 1202 of FIG. 12A shows identifier (ID) for the data or content items, section 1204 shows version, sections 1206 and 1208 shows time of extraction of the content items, section 1210 shows linked type of label, and section 1212 shows the label like funding. The values represented by the content items like investors are shown in sections 1214 and 1216. The source of data extraction like news articles, blogs etc. represented as code is shown in section 1218.

FIG. 12B shows other sections of the GUI 1200 which illustrates section 1220 as data managed by administrators. Section 1222 shows the link of the data source from where the content items are extracted, and section 1224 shows the latest update of the content items. Section 1226 shows first node/entity, and the section 1228 shows second node/entity. A label shown in section 1230 is selected by a user or administrator based on the content items. The content items may be labelled as hard, medium, and easy based on the complexity of the content items. For example, if content items extracted includes 2-3 direct statements like company X was acquired by company Y, the acquisition was completed on May 8, 2023. The content items in this example will be labelled as easy.

In another example, content items represent 3-5 indirect statements like company Z is a merger, company A and B were acquired recently, and company B is a startup. These statements make the outcome difficult to predict from the statements and the content items will therefore be labelled as medium. In another example, content items represent 5-7 statements like company A is an entity, company B is a subsidiary of company D, recent changes in company A structure and company Y is a competitor of company D. These statements make the outcome harder to predict and therefore, will be labelled as hard. Section 1232 represents few shot selection of data. Section 1234 represents the outcome from the content items in readable form.

FIG. 13 illustrates a GUI 1300 that represents the prompt, context and output from the prompt. Labels such as acquisition, merger, funding, joint ventures, bankruptcy are represented. Entities/nodes such as acquirer, acquirees, investor, investees, merger, merges are identified from the content items. Feature vectors are represented from the labels and node/entity information acquired from the content items that are extracted from the data sources like news articles and blogs. These feature vectors are clustered and represented as shown in FIGS. 8-9.

Figure 14:
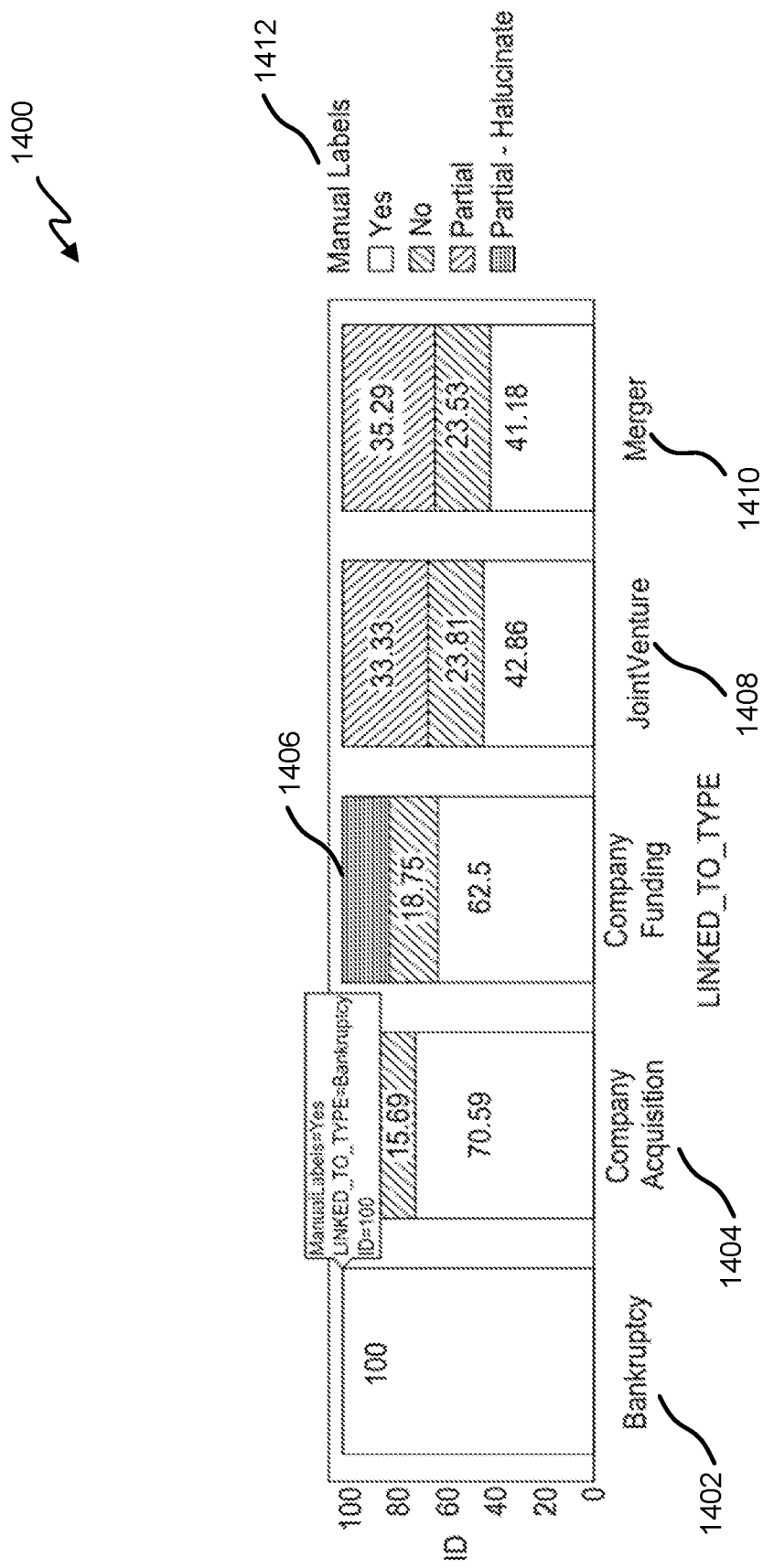
FIG. 14 shows a graphical representation of the output of the selection of content items by the user or administrator according to some embodiments of the invention.

FIG. 14 illustrates a graphical representation 1400 of the output of the selection of content items by the user or administrator as shown in FIGS. 12A-12B. The content items are vertically represented with identifiers ID. The labels such as bankruptcy 1402, company acquisition 1404, company funding 1406, joint venture 1408 and merger 1410 are horizontally represented. The manual labels 1412 represent the indication from the user as to whether the content items are correctly labelled by the machine learning models. The manual labels are yes, no, partial, and partial hallucinate. Yes and no indicates whether both the nodes/entities and edges/relationship are predicted correctly. Partial indicates either of them is wrong, that could be entity, relationship or partial. Hallucinate is sometimes when companies talk about another company but they don't mention the company name like it was acquired by so and so company so that it was filled by machine learning models because of its knowledge from the previous data.

Figure 15:
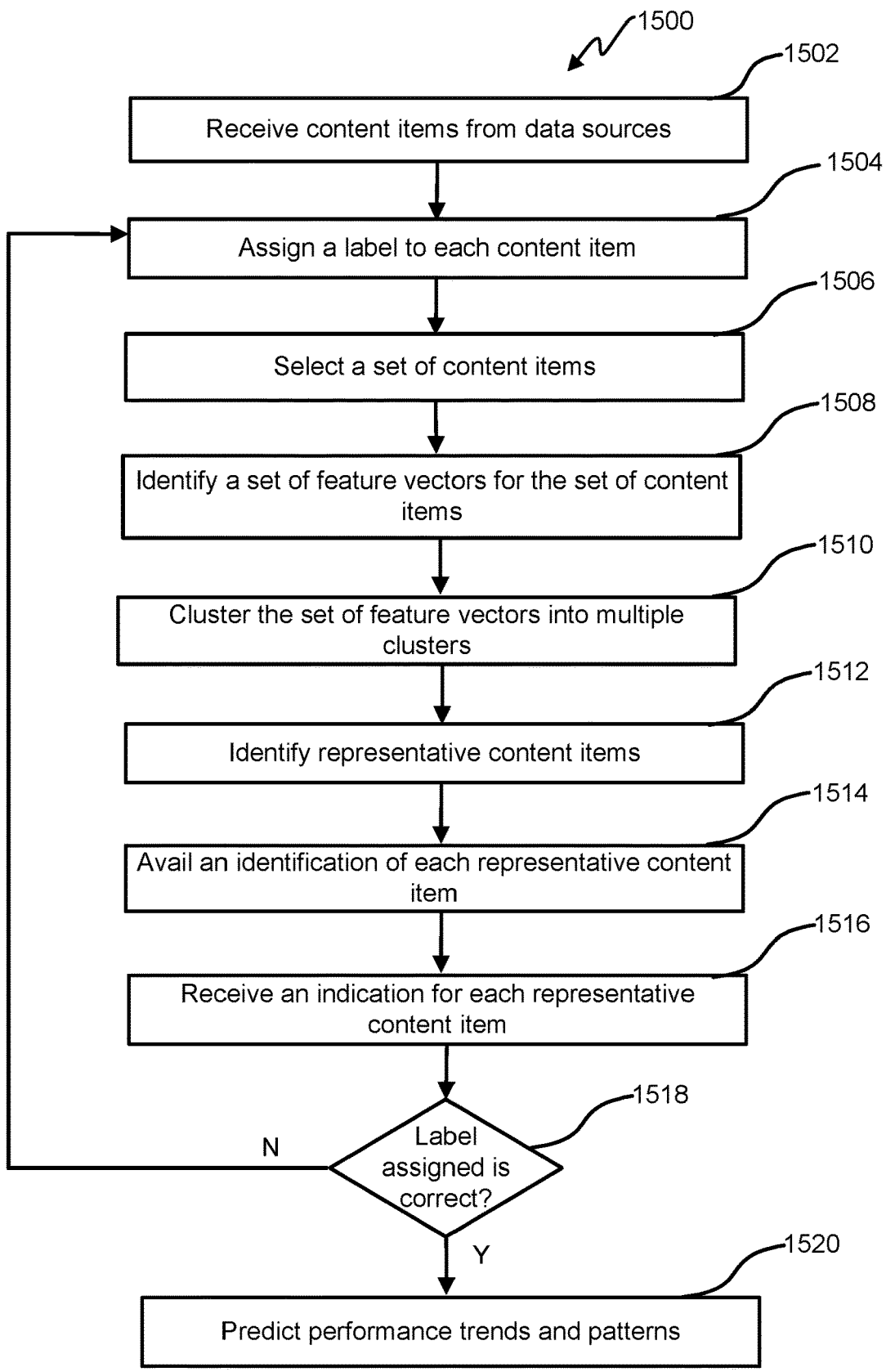
FIG. 15 is a flowchart of process for acquiring, processing, and transforming news articles according to some embodiments of the invention.

FIG. 15 is a flowchart of process 1500 for acquiring, processing, and transforming news articles according to some embodiments of the invention. The process 1500 may be performed at least in part by any of the component described in the figures herein, for example, by the data processing server 102. The process 1500 can begin at block 1502, where the data processing server 102 receives content items from multiple data sources. In some embodiments, the data extraction engine 104 acquires the data through a data source engine 116.

In some other embodiments, the data extraction engine 104 acquires the data from the client device 118 associated with the end user 120. All the data acquired by the data extraction engine 104 is collectively referred to as content items. The content items acquired from the multiple sources include information regarding key developments and events pertaining to corporate entities. The multiple data sources may include one or more public data sources such as news articles, blogs associated with news, webpages, etc. A content item may include all or part of: a webpage, an online post (e.g., social-media post or post to a news channel), a blog, a video blog, an app-based message, or other online or print content item related to one or more entities and/or one or more private data sources such as data sources linked with specific entities defining the key developments and events related to functional, operational, structural, and performance related events of specific entities. The key developments and events includes acquisitions, joint ventures, mergers, bankruptcy, layoffs, law suites, funding etc. Such key developments and events form an integral part in determining the functional, structural, operational and performance aspects of one or more entities.

At block 1504, the data processing server 102 assigns a label of a plurality of labels to each of the plurality of content items. The label may be assigned using one or more label machine learning models 106. The label ML models 106 are trained to assign a particular label to a content item according to the data elements of the content item that includes entities and their corresponding information. The label classifier 302 is trained and finetuned to identify a classifier (broad category) of the content items received from multiple data sources. The labels of the content items, such as joint venture, acquisition, merger, funding, bankruptcy, law-suite, etc.

At block 1506, the data processing server 102 selects a set of content items from the plurality of content items. Each content item of the set of content items is associated with a particular label of the plurality of labels. The selected set of content items are further categorised based on their types like merger, acquisition, funding, etc. The set of content items are selected based on a user selection of a label that corresponds to the set of content items.

At block 1508, the data processing server 102 further identifies a set of feature vectors for the set of content items. The set of feature vectors are identified using the feature-vector ML model 108. The feature-vector ML model 108 may identify a set of feature-vectors for the set of content items and define the relationship and/or the relationship-type of the entities based on the set of feature-vectors. The feature vector includes nodes/entities and edges/relationships. The feature-vector ML model 108 processes the multiple data objects generated by the data extraction engine 104 and the multiple feature vectors to define a relationship between the entities. The defined relationship between the entities indicates whether an entity is acquiring another entity, whether an entity is partnering with another entity, whether an entity is running short on resources (for example, bankruptcy, or lay-offs) etc. The relationships defined herein are not limited to the exemplary scenario discussed above and may include other key developments and events associated with entity for which the plurality of feature vectors is generated.

At block 1510, the data processing server 102 clusters the set of feature vectors into multiple clusters. The clusters are associated with the entities are defined such that the feature vectors associated with the clusters are plotted across a multi-dimensional space to generate the visual representation and/or a machine-learning based graphical representation of the feature vectors. The clusters of the feature vectors associated with the entities may include multiple nodes and edges. The nodes are associated with an identifier of the entities and the edges are associated with the relationship and/or the relationship-type of the entities.

At block 1512, the data processing server 102 identifies representative content items from among the content items assigned to the cluster. For example, each cluster of the multiple clusters is processed to identify a representative content item that represents content of that cluster. The representative content item is presented to the end user 120 on the user interface. For example, if the news article specifies that a company A is merged with company B, then the company A and company B are represented as nodes and merger is represented as an edge. The data of merger is represented as the edge.

At block 1514, the data processing server 102 avails an identification of each representative content item to a user on the user interface. The identification is availed for each cluster of the multiple clusters. The identification includes a label associated with the cluster. The label includes acquisition, funding, bankruptcy, merger etc.

At block 1516, the data processing server 102 provides a notification to the end user 120 to provide an indication for each representative content item of the one or more representative content items of the cluster as to whether the label corresponds to the representative content item. The indication is provided based on the identification of the label of each representative content item that is assigned by the label ML model 106. The indication regarding whether the particular label corresponds to the representative content item is manually provided by the end user 120. For example, whether a company A has been correctly labeled as merger.

At block 1518, the end user 120 provides the indication whether the representative content item is correctly labeled using the client device 118. If not, then the process of identifying the label again starts at block 1504 else at block 1520, the process moves to predicting performance trends and patterns of the entities in the content items using the information provided by the clusters. One or more machine learning techniques are used to predict performance trends and patterns.

One or more trends are predicted when the determination that the particular label corresponds to the representative content item is indicated by the end user 120. The one or more trends are market trends, information on entities, competitors, possible mergers, acquisitions etc. The trends are presented to the user on the user station 122 and/or the client device 118 for further analysis and/or processing.

Figure 16:
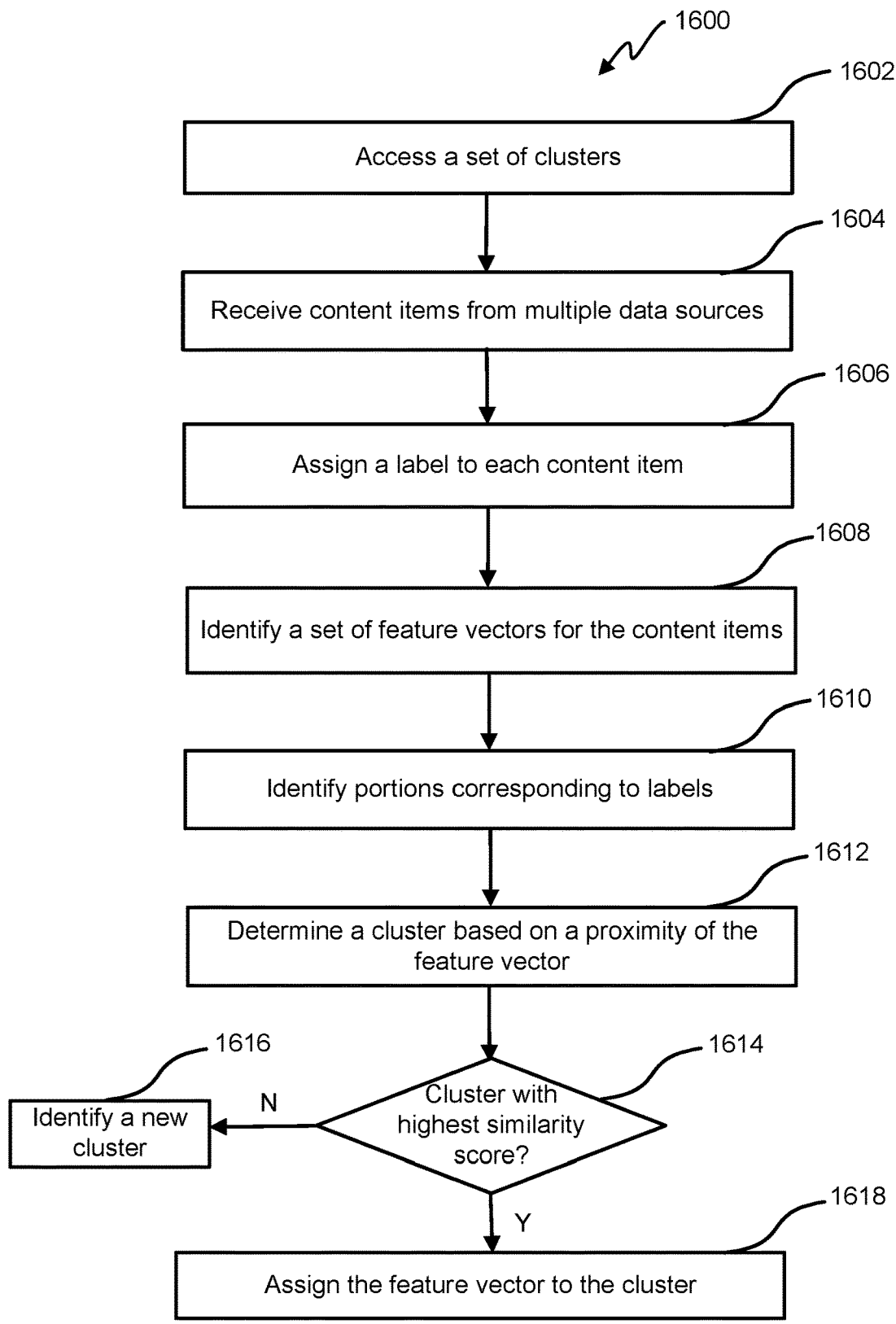
FIG. 16 is a flowchart of process for assigning feature vectors according to some embodiments of the invention.

FIG. 16 is a flowchart of process 1600 for assigning a cluster to a feature vector associated with a new content item according to some embodiments of the invention. The process 1600 may be performed at least in part by any of the components described in the figures herein, for example, by the data processing server 102. The process 1600 can begin at block 1602, when the data processing server 102 receives a new content item from the data source engine 116. The data processing server 102 accesses a set of clusters from multiple clusters. Each cluster of the multiple clusters is defined to cover a portion of a multi-dimensional feature space, and each cluster of the plurality of clusters is associated with a label of a plurality of labels.

At block 1604, the data processing server 102 receives the content items from multiple data sources including the new content item. In some embodiments, the data extraction engine 104 acquires the data through a data source engine 116. In some other embodiments, the data extraction engine 104 acquires the data from the client device 118 associated with the end user 120. All the data acquired by the data extraction engine 104 is collectively referred to as content items. The content items acquired from the multiple sources include information regarding key developments and events pertaining to corporate entities.

The multiple data sources may include one or more public data sources such as published news articles and media associated with the news articles, blogs associated with news, webpages, etc. A content item may include all or part of: a webpage, an online post (e.g., social-media post or post to a news channel), a blog, a video blog, an app-based message, or other online or print content item related to one or more entities and/or one or more private data sources such as data sources linked with specific entities defining the key developments and events related to functional, operational, structural, and performance related events of specific entities. The key developments and events include acquisitions, joint ventures, mergers, bankruptcy, layoffs, law suites, funding etc. Such key developments and events form an integral part in determining the functional, structural, operational and performance aspects of one or more entities.

At block 1606, the data processing server 102 assigns a label of a plurality of labels to each of the plurality of content items. The label may be assigned using one or more label machine learning models 106. The label ML models 106 are trained to assign a particular label to a content item according to the data elements of the content item that includes entities and their corresponding information. The label is assigned to a content item based on the type of content item. The label classifier 302 is trained and finetuned to identify a classifier (broad category) of the content items received from multiple data sources. The labels of the content items, include joint venture, acquisition, merger, funding, bankruptcy, law-suite, etc.

At block 1608, the data processing server 102 identifies a set of feature vectors for the set of content items. The set of feature vectors are identified using the feature-vector ML model 108. Each feature vector of the content item is associated with a respective portion in the multi-dimensional feature space. The feature-vector ML model 108 may identify a set of feature-vectors for the set of content items and define the relationship and/or the relationship-type of the entities based on the set of feature-vectors. The feature-vector ML model 108 may process the multiple data objects generated by the data extraction engine 104 and the multiple feature vectors to define a relationship between the entities. The defined relationship between the entities indicates, but is not limited to, whether an entity is acquiring another entity, whether an entity is partnering with another entity, whether an entity is running short on resources (for example, bankruptcy, or lay-offs) etc. The relationships defined herein are not limited to the exemplary scenario discussed above and may include other key developments and events associated with entity for which the plurality of feature vectors is generated. The feature vectors include nodes/entities and edges/representations. The feature vector is vector representation of the information pertaining to the nodes and edges represented in the form of knowledge graphs or clusters. The feature vectors form a cluster.

At block 1610, the data processing server 102 identifies portions corresponding to the plurality of labels. The portions are identified in the multi-dimensional feature space. At block 1612, the data processing server 102 determines a cluster from the plurality of clusters for assigning to the feature vector. The cluster is determined based on a proximity of the feature vector to the plurality of clusters in the multi-dimensional feature space. The proximity identifier 704 determines the proximity of each cluster with the feature vector. For example, if the news article specifies that a company A is merged with company B, then the company A and company B are represented as nodes and merger is represented as an edge and the feature vector corresponding to a company C that is a subsidiary of the company B may be added in the cluster. The proximity of the feature vector to the cluster is determined based on similarity scores of the feature vector with respect to each cluster determined by the scorer 708.

At block 1614, the cluster with a highest similarity score with respect to the feature vector is determined by the scorer 708. Based on the highest similarity score, the respective cluster is determined closest to the feature vector in the multi-dimensional feature space that is most similar in terms of the label and entities of the cluster with the label and entities of the feature vector.

At block 1618, the data processing server 102 assigns the feature vector to the cluster determined at block 1612. The feature vector is assigned in the portion of the multi-dimensional feature space covered by the cluster. Further, the data processing server 102 creates an updated cluster. The updated cluster is created based on the assigning of the feature vector to the cluster.

In case the cluster does not have a similarity score above a predefined threshold set for the comparison of similarity between the labels of the clusters and the label of the feature vector, then at block 1616, a new cluster is assigned for the feature vector by the label ML models 106 based on the data attributes of the new content item of the feature vector.

Figure 17:
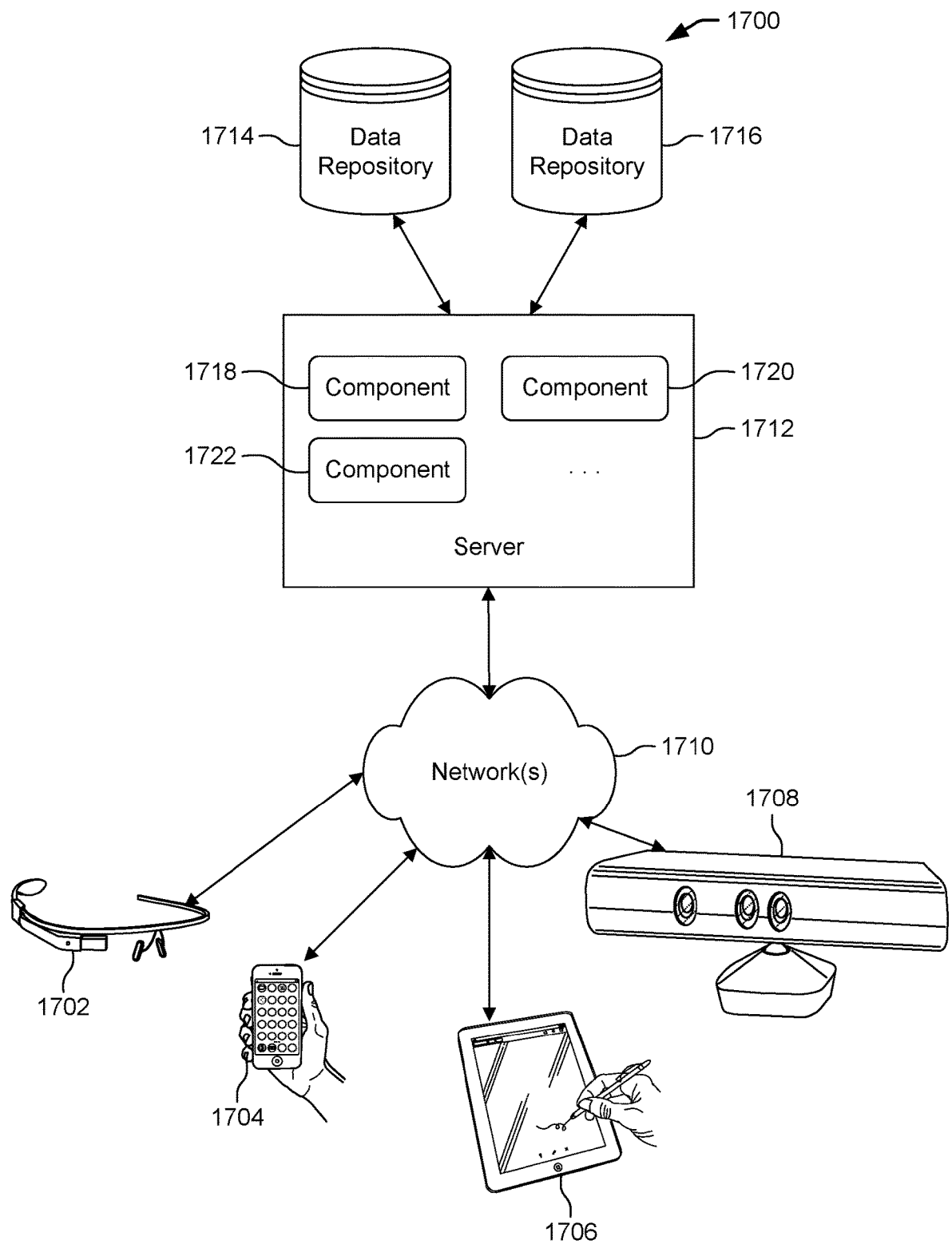
FIG. 17 depicts a simplified diagram of a distributed system for implementing an embodiment of the invention.

FIG. 17 depicts a simplified diagram of a distributed system 1700 for implementing an embodiment of the invention. In the illustrated embodiment, distributed system 1700 includes one or more client computing devices 1702, 1704, 1706, and 1708, coupled to a server 1712 via one or more communication networks 1710. Clients computing devices 1702, 1704, 1706, and 1708 may be configured to execute one or more applications.

In various aspects, server 1712 may be adapted to run one or more services or software applications that enable techniques for handling long text for pre-trained language models.

In certain aspects, server 1712 may also provide other services or software applications that can include non-virtual and virtual environments. In some aspects, these services may be offered as web-based or cloud services, such as under a Software as a Service (SaaS) model to the users of client computing devices 1702, 1704, 1706, and/or 1708. Users operating client computing devices 1702, 1704, 1706, and/or 1708 may in turn utilize one or more client applications to interact with server 1712 to utilize the services provided by these components.

In the configuration depicted in FIG. 17, server 1712 may include one or more components 1718, 1720, and 1722 that implement the functions performed by server 1712. These components may include software components that may be executed by one or more processors, hardware components, or combinations thereof. It should be appreciated that various different system configurations are possible, which may be different from distributed system 1700. The embodiment shown in FIG. 17 is thus one example of a distributed system for implementing an embodiment system and is not intended to be limiting.

Users may use client computing devices 1702, 1704, 1706, and/or 1708 for techniques for handling long text for pre-trained language models in accordance with the teachings of this disclosure. A client device may provide an interface that enables a user of the client device to interact with the client device. The client device may also output information to the user via this interface. Although FIG. 17 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1710 may be any type of network familiar to those skilled in the art that can support data communications using any of a variety of available protocols, including without limitation TCP/IP (transmission control protocol/ Internet protocol), SNA (systems network architecture), IPX (Internet packet exchange), AppleTalk®, and the like. Merely by way of example, network(s) 9010 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1712 can include one or more virtual machines running virtual operating systems, or other computing architectures involving virtualization such as one or more flexible pools of logical storage devices that can be virtualized to maintain virtual storage devices for the server. In various aspects, server 1712 may be adapted to run one or more services or software applications that provide the functionality described in the foregoing disclosure.

The computing systems in server 1712 may run one or more operating systems including any of those discussed above, as well as any commercially available server operating system. Server 1712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1712 may include one or more applications to analyze and consolidate data feeds and/or event updates received from users of client computing devices 1702, 1704, 1706, and 1708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1712 may also include one or more applications to display the data feeds and/or real-time events via one or more display devices of client computing devices 1702, 1704, 1706, and 1708.

Distributed system 1700 may also include one or more data repositories 1714, 1716. These data repositories may be used to store data and other information in certain aspects. For example, one or more of the data repositories 1714, 1716 may be used to store information for techniques for handling long text for pre-trained language models (e.g., intent score, overall score). Data repositories 1714, 1716 may reside in a variety of locations. For example, a data repository used by server 1712 may be local to server 1712 or may be remote from server 1712 and in communication with server 1712 via a network-based or dedicated connection. Data repositories 1714, 1716 may be of different types. In certain aspects, a data repository used by server 1712 may be a database, for example, a relational database, such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 1714, 1716 may also be used by applications to store application data. The data repositories used by applications may be of different types such as, for example, a key-value store repository, an object store repository, or a general storage repository supported by a file system.

Figure 18:
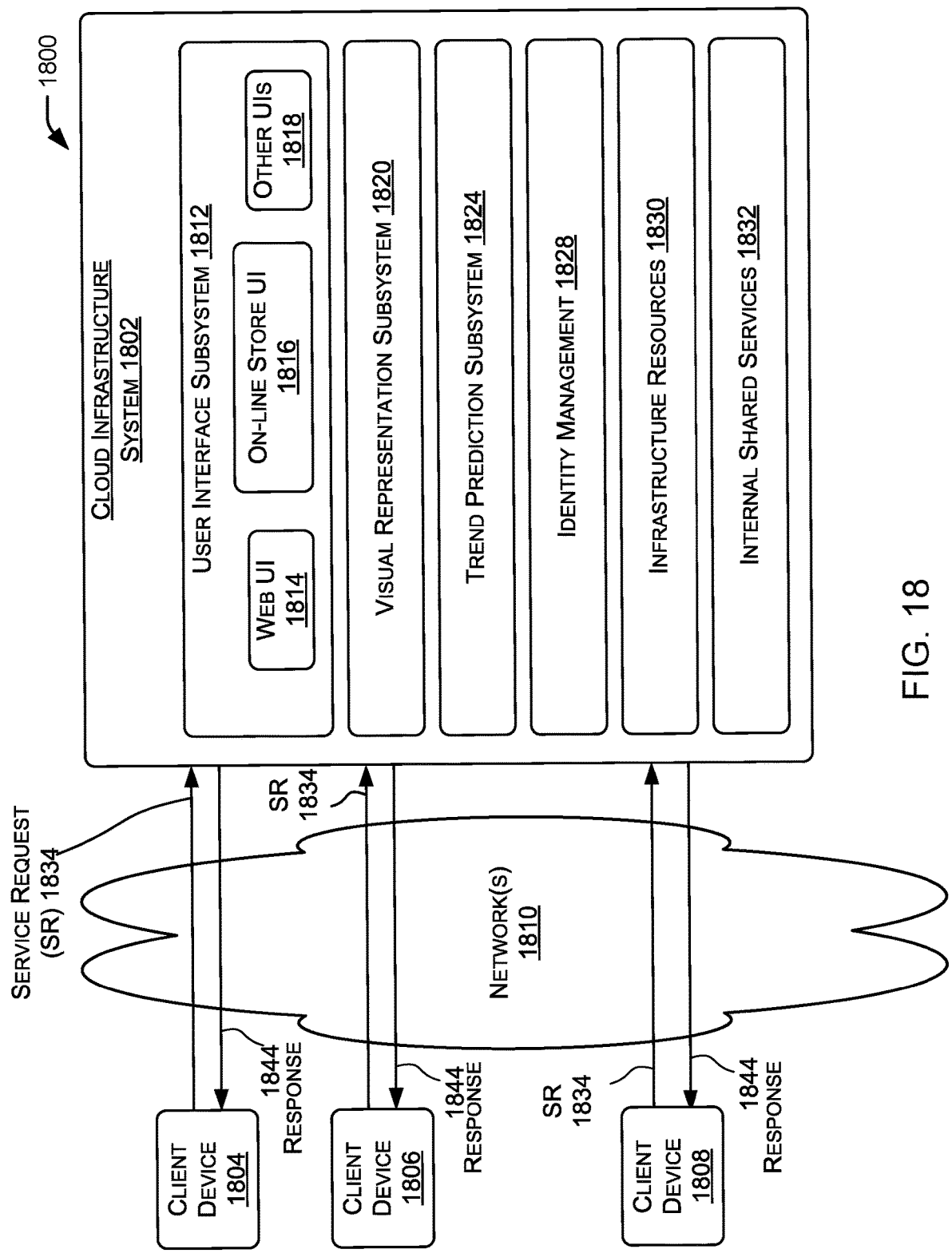
FIG. 18 is a simplified block diagram of a cloud-based system environment in which various text handling-related services may be offered as cloud services according to some embodiments of the invention.

In certain aspects, the techniques for handling long text for pre-trained language models functionalities described in this disclosure may be offered as services via a cloud environment. FIG. 18 is a simplified block diagram of a cloud-based system environment in which various text handling-related services may be offered as cloud services according to some embodiments of the invention. In the embodiment depicted in FIG. 18, cloud infrastructure system 1802 may provide one or more cloud services that may be requested by users using one or more client computing devices 1804, 1806, and 1808. Cloud infrastructure system 1802 may comprise one or more computers and/or servers that may include those described above for server. The computers in cloud infrastructure system 1802 may be organized as general purpose computers, specialized server computers, server farms, server clusters, or any other appropriate arrangement and/or combination.

Network(s) 1810 may facilitate communication and exchange of data between clients 1804, 1806, and 1808 and cloud infrastructure system 1802. Network(s) 1810 may include one or more networks. The networks may be of the same or different types. Network(s) 1810 may support one or more communication protocols, including wired and/or wireless protocols, for facilitating the communications.

The embodiment depicted in FIG. 18 is only one example of a cloud infrastructure system and is not intended to be limiting. It should be appreciated that, in some other aspects, cloud infrastructure system 1802 may have more or fewer components than those depicted in FIG. 18, may combine two or more components, or may have a different configuration or arrangement of components. For example, although FIG. 18 depicts three client computing devices, any number of client computing devices may be supported in alternative aspects.

The term cloud service is generally used to refer to a service that is made available to users on demand and via a communication network such as the Internet by systems (e.g., cloud infrastructure system 1802) of a service provider. Typically, in a public cloud environment, servers and systems that make up the cloud service provider's system are different from the client's own on premise servers and systems. The cloud service provider's systems are managed by the cloud service provider. Clients can thus avail themselves of cloud services provided by a cloud service provider without having to purchase separate licenses, support, or hardware and software resources for the services. For example, a cloud service provider's system may host an application, and a user may, via a network 1810 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as middleware services, database services, Java cloud services, and others.

In certain aspects, cloud infrastructure system 1802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1802 may include a suite of applications, middleware, databases, and other resources that enable provision of the various cloud services.

A SaaS model enables an application or software to be delivered to a client over a communication network like the Internet, as a service, without the client having to buy the hardware or software for the underlying application. For example, a SaaS model may be used to provide clients access to on-demand applications that are hosted by cloud infrastructure system 1802. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a client as a cloud service to provide elastic compute and storage capabilities. Various IaaS services are provided by Oracle Corporation®.

A PaaS model is generally used to provide, as a service, platform and environment resources that enable clients to develop, run, and manage applications and services without the client having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a client, via a subscription order, may order one or more services provided by cloud infrastructure system 1802. Cloud infrastructure system 1802 then performs processing to provide the services requested in the client's subscription order. Cloud infrastructure system 1802 may be configured to provide one or even multiple cloud services.

Cloud infrastructure system 1802 may provide the cloud services via different deployment models. In a public cloud model, cloud infrastructure system 1802 may be owned by a third party cloud services provider and the cloud services are offered to any general public client, where the client can be an individual or an enterprise. In certain other aspects, under a private cloud model, cloud infrastructure system 1802 may be operated within an organization (e.g., within an enterprise organization) and services provided to clients that are within the organization. For example, the clients may be various departments of an enterprise such as the Human Resources department, the Payroll department, etc. or even individuals within the enterprise. In certain other aspects, under a community cloud model, the cloud infrastructure system 1802 and the services provided may be shared by several organizations in a related community. Various other models such as hybrids of the above mentioned models may also be used.

Client computing devices 1804, 1806, and 1808 may be of different types (such as devices 1702, 1704, 1706, and 1708 depicted in FIG. 17) and may be capable of operating one or more client applications. A user may use a client device to interact with cloud infrastructure system 1802, such as to request a service provided by cloud infrastructure system 1802. For example, a user may use a client device to request a chat bot service described in this disclosure.

In some aspects, the processing performed by cloud infrastructure system 1802 for providing Chabot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1802 for determining the intent of an utterance. The data used for this analysis may include structured data (e.g., data stored in a database or structured according to a structured model) and/or unstructured data (e.g., data blobs (binary large objects)).

As depicted in the embodiment in FIG. 18, cloud infrastructure system 1802 may include infrastructure resources 1830 that are utilized for facilitating the provision of various cloud services offered by cloud infrastructure system 1802. Infrastructure resources 1830 may include, for example, processing resources, storage or memory resources, networking resources, and the like.

In certain aspects, to facilitate efficient provisioning of these resources for supporting the various cloud services provided by cloud infrastructure system 1802 for different clients, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1802 may itself internally use services 1832 that are shared by different components of cloud infrastructure system 1802 and which facilitate the provisioning of services by cloud infrastructure system 1802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1802 may comprise multiple subsystems. These subsystems may be implemented in software, or hardware, or combinations thereof. As depicted in FIG. 18, the subsystems may include a user interface subsystem 1812 that enables users or clients of cloud infrastructure system 1802 to interact with cloud infrastructure system 1802. User interface subsystem 1812 may include various different interfaces such as a web interface 1814, an online store interface 1816 where cloud services provided by cloud infrastructure system 1802 are advertised and are purchasable by a consumer, and other interfaces 1818. For example, a client may, using a client device, request (service request 1834) one or more services provided by cloud infrastructure system 1802 using one or more of interfaces 1814, 1816, and 1818. For example, a client may access the online store, browse cloud services offered by cloud infrastructure system 1802, and place a subscription order for one or more services offered by cloud infrastructure system 1802 that the client wishes to subscribe to. The service request may include information identifying the client and one or more services that the client desires to subscribe to. For example, a client may place a subscription order for a Chabot related service offered by cloud infrastructure system 1802. As part of the order, the client may provide information identifying for input (e.g., utterances).

In certain aspects, such as the embodiment depicted in FIG. 18, cloud infrastructure system 1802 may comprise a visual representation subsystem (VRS) 1820 that is configured to predict the trends. As part of this processing, VRS 1820 may be configured to: receive content items from multiple sources, assign label to the content items, and generate a visual representation using clusters of the content items.

Once properly validated, VRS 1820 may then invoke the trend prediction subsystem (TPS) 1824 that is configured to provision resources for the order including processing, memory, and networking resources. The provisioning may include allocating resources for the order and configuring the resources to facilitate the service requested by the client order. The manner in which resources are provisioned for an order and the type of the provisioned resources may depend upon the type of cloud service that has been ordered by the client. For example, according to one workflow, TPS 1824 may be configured to determine the particular cloud service being requested and identify the trends as described above.

Cloud infrastructure system 1802 may send a response or notification 1844 to the requesting client to indicate when the requested service is now ready for use. In some instances, information (e.g., a link) may be sent to the client that enables the client to start using and availing the benefits of the requested services.

Cloud infrastructure system 1802 may provide services to multiple clients. For each client, cloud infrastructure system 1802 is responsible for managing information related to one or more subscription orders received from the client, maintaining client data related to the orders, and providing the requested services to the client. Cloud infrastructure system 1802 may also collect usage statistics regarding a client's use of subscribed services. For example, statistics may be collected for the amount of storage used, the amount of data transferred, the number of users, and the amount of system up time and system down time, and the like. This usage information may be used to bill the client. Billing may be done, for example, on a monthly cycle.

Cloud infrastructure system 1802 may provide services to multiple clients in parallel. Cloud infrastructure system 1802 may store information for these clients, including possibly proprietary information. In certain aspects, cloud infrastructure system 1802 comprises an identity management subsystem (IMS) 1828 that is configured to manage client's information and provide the separation of the managed information such that information related to one client is not accessible by another client. IMS 1828 may be configured to provide various security-related services such as identity services, such as information access management, authentication and authorization services, services for managing client identities and roles and related capabilities, and the like.

Figure 19:
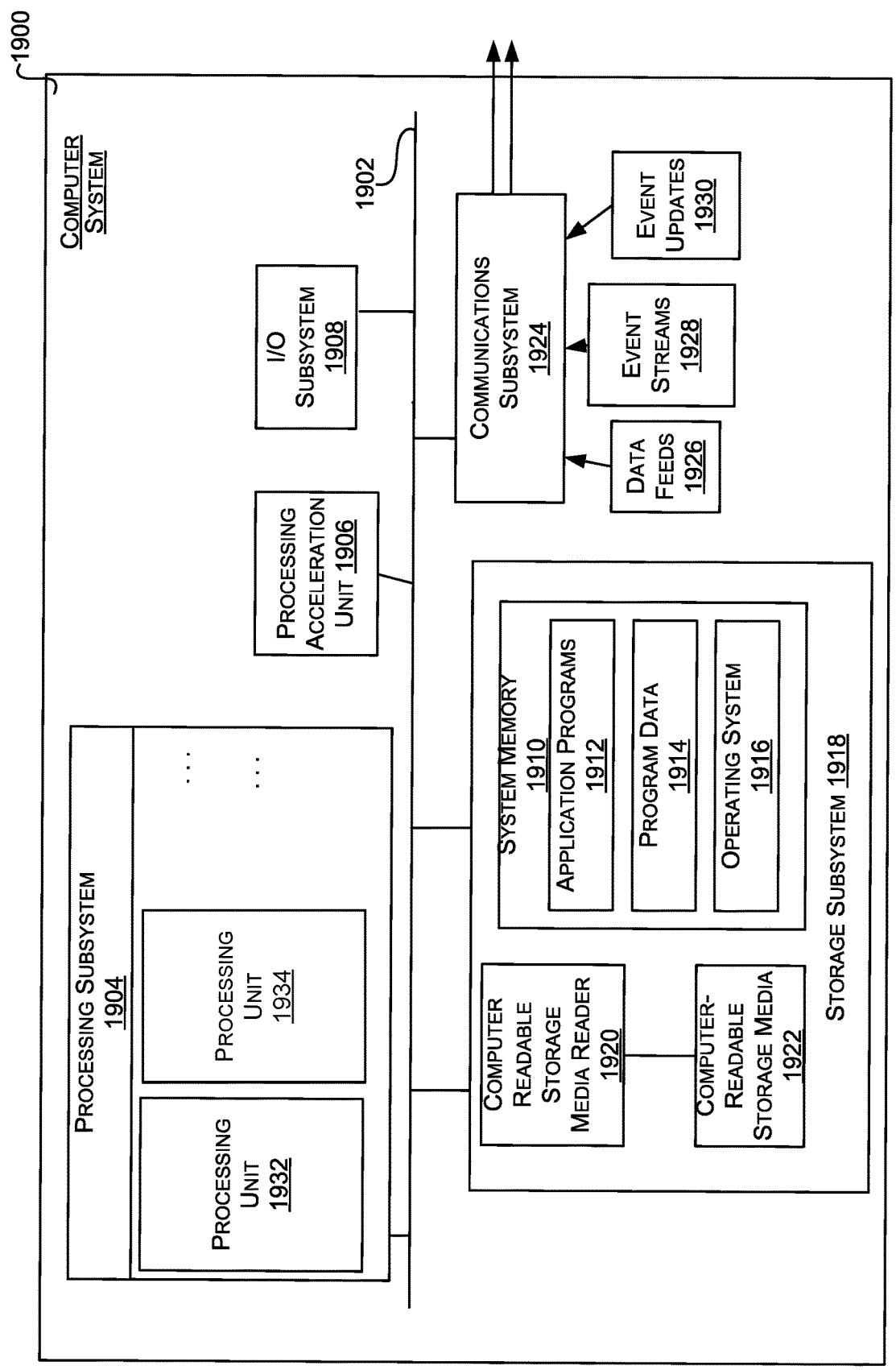
FIG. 19 shows an exemplary computer system that may be used to implement certain aspects according to some embodiments of the invention.

FIG. 19 shows an exemplary computer system 1900 that may be used to implement certain aspects according to some embodiments of the invention. For example, in some aspects, computer system 1900 may be used to implement any of the system 1900 for enriching log records with fields from other log records in structured format as shown in FIG. 1 and various servers and computer systems described above. As shown in FIG. 19, computer system 1900 includes various subsystems including a processing subsystem 1904 that communicates with a number of other subsystems via a bus subsystem 1902. These other subsystems may include a processing acceleration unit 1906, an I/O subsystem 1908, a storage subsystem 1918, and a communications subsystem 1924. Storage subsystem 1918 may include non-transitory computer-readable storage media including storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative aspects of the bus subsystem may utilize multiple buses. Bus subsystem 1902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1904 controls the operation of computer system 1900 and may comprise one or more processors, application specific integrated circuits (ASICs), or field programmable gate arrays (FPGAs). The processors may include be single core or multicore processors. The processing resources of computer system 1900 can be organized into one or more processing units 1932, 1934, etc. A processing unit may include one or more processors, one or more cores from the same or different processors, a combination of cores and processors, or other combinations of cores and processors. In some aspects, processing subsystem 1904 can include one or more special purpose co-processors such as graphics processors, digital signal processors (DSPs), or the like. In some aspects, some or all of the processing units of processing subsystem 1904 can be implemented using customized circuits, such as application specific integrated circuits (ASICs), or field programmable gate arrays (FPGAs).

In some aspects, the processing units in processing subsystem 1904 can execute instructions stored in system memory 1910 or on computer readable storage media 1922. In various aspects, the processing units can execute a variety of programs or code instructions and can maintain multiple concurrently executing programs or processes. At any given time, some or all of the program code to be executed can be resident in system memory 1910 and/or on computer-readable storage media 1922 including potentially on one or more storage devices. Through suitable programming, processing subsystem 1904 can provide various functionalities described above. In instances where computer system 1900 is executing one or more virtual machines, one or more processing units may be allocated to each virtual machine.

In certain aspects, a processing acceleration unit 1906 may optionally be provided for performing customized processing or for off-loading some of the processing performed by processing subsystem 1904 so as to accelerate the overall processing performed by computer system 1900.

I/O subsystem 1908 may include devices and mechanisms for inputting information to computer system 1900 and/or for outputting information from or via computer system 1900. In general, use of the term input device is intended to include all possible types of devices and mechanisms for inputting information to computer system 1900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 1918 provides a repository or data store for storing information and data that is used by computer system 1900. Storage subsystem 1918 provides a tangible non-transitory computer-readable storage medium for storing the basic programming and data constructs that provide the functionality of some aspects. Storage subsystem 1918 may store software (e.g., programs, code modules, instructions) that when executed by processing subsystem 1904 provides the functionality described above. The software may be executed by one or more processing units of processing subsystem 1904. Storage subsystem 1918 may also provide a repository for storing data used in accordance with the teachings of this disclosure.

Storage subsystem 1918 may include one or more non-transitory memory devices, including volatile and non-volatile memory devices. As shown in FIG. 19, storage subsystem 1918 includes a system memory 1910 and a computer-readable storage media 1922. System memory 1910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1900, such as during start-up, may typically be stored in the ROM. The RAM typically contains data and/or program modules that are presently being operated and executed by processing subsystem 1904. In some implementations, system memory 1910 may include multiple different types of memory, such as static random access memory (SRAM), dynamic random access memory (DRAM), and the like.

By way of example, and not limitation, as depicted in FIG. 19, system memory 1910 may load application programs 1912 that are being executed, which may include various applications such as Web browsers, mid-tier applications, relational database management systems (RDBMS), etc., program data 1914, and an operating system 1916. By way of example, operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1922 may store programming and data constructs that provide the functionality of some aspects. Computer-readable media 1922 may provide storage of computer-readable instructions, data structures, program modules, and other data for computer system 1900. Software (programs, code modules, instructions) that, when executed by processing subsystem 1904 provides the functionality described above, may be stored in storage subsystem 1918. By way of example, computer-readable storage media 1922 may include non-volatile memory such as a hard disk drive, a magnetic disk drive, an optical disk drive such as a CD ROM, digital video disc (DVD), a Blu-Ray® disk, or other optical media. Computer-readable storage media 1922 may include, but is not limited to, Zip® drives, flash memory cards, universal serial bus (USB) flash drives, secure digital (SD) cards, DVD disks, digital video tape, and the like. Computer-readable storage media 1922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 1918 may also include a computer-readable storage media reader 1920 that can further be connected to computer-readable storage media 1922. Reader 1920 may receive and be configured to read data from a memory device such as a disk, a flash drive, etc.

In certain aspects, computer system 1900 may support virtualization technologies, including but not limited to virtualization of processing and memory resources. For example, computer system 1900 may provide support for executing one or more virtual machines. In certain aspects, computer system 1900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1900. Accordingly, multiple operating systems may potentially be run concurrently by computer system 1900.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to establish a communication channel to one or more client devices via the Internet for receiving and sending information from and to the client devices. For example, the communication subsystem may be used to transmit a response to a user regarding the inquiry for a Chabot.

Communication subsystem 1924 may support both wired and/or wireless communication protocols. For example, in certain aspects, communications subsystem 1924 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 1924 can provide wired network connectivity (e.g., Ethernet) in addition to or instead of a wireless interface.

Communication subsystem 1924 can receive and transmit data in various forms. For example, in some aspects, in addition to other forms, communications subsystem 1924 may receive input communications in the form of structured and/or unstructured data feeds 1926, event streams 1928, event updates 1930, and the like. For example, communications subsystem 1924 may be configured to receive (or send) data feeds 1926 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 1924 may be configured to receive data in the form of continuous data streams, which may include event streams 1928 of real-time events and/or event updates 1930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1924 may also be configured to communicate data from computer system 1900 to other computer systems or networks. The data may be communicated in various different forms such as structured and/or unstructured data feeds 1926, event streams 1928, event updates 1930, and the like to one or more databases that may be in communication with one or more streaming data source computers coupled to computer system 1900.

Computer system 1900 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 1900 depicted in FIG. 19 is intended only as a specific example. Many other configurations having more or fewer components than the system depicted in FIG. 19 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:
   receiving an input content item;
   for the input content item, generating a prompt to a natural language machine learning model, wherein the prompt comprises:
   a plurality of entity relationship types,
   at least one example output entity relationship type and output entities for an example content item, and
   a request to determine, for the input content item, which entity relationship type of the plurality of entity relationship types and which entities correspond to the input content item;

causing execution of the prompt to determine a particular entity relationship type and two or more entities that correspond to the input content item;
determining at least a particular feature vector of at least a particular entity of the two or more entities;
comparing the particular feature vector to a plurality of feature vectors representing at least a plurality of stored entities defined for a plurality of clusters;
adding the particular entity relationship type and the two or more entities to a particular cluster of the plurality of clusters based at least in part on a proximity, in a multi-dimensional feature space of a feature vector machine learning model, between the particular feature vector and one or more feature vectors representing the particular cluster; and
using the particular cluster to respond to a query about the particular entity.

2. The computer-implemented method of claim 1, wherein the particular cluster is determined for adding the particular entity relationship type and the two or more entities to be a cluster with a highest similarity score among the plurality of clusters determined based at least in part on the comparing the particular feature vector to the plurality of feature vectors.

3. The computer-implemented method of claim 1, wherein, for another particular entity relationship type and another two or more entities that correspond to another input content item, a new cluster is assigned to at least another entity of the other two or more entities when the similarity score between another particular feature vector of the other particular entity relationship type and the other two or more entities and the plurality of feature vectors is below a predefined threshold.

4. The computer-implemented method of claim 1, wherein the plurality of entity relationship types include acquisitions, joint ventures, mergers, bankruptcy, layoffs, lawsuits, and funding.

5. The computer-implemented method of claim 1, wherein each of the plurality of clusters include nodes and edges, the nodes associated with entities and the edges are associated with relationship types.

6. The computer-implemented method of claim 1, wherein the natural language machine learning model comprises a large language model pre-trained to handle text, and wherein the input content item is a news article.

7. A system comprising:
one or more processors; and
a memory coupled to the one or more processors, the memory storing a plurality of instructions executable by the one or more processors, the plurality of instructions that when executed by the one or more processors cause the one or more processors to perform a set of operations comprising:
receiving an input content item;
for the input content item, generating a prompt to a natural language machine learning model, wherein the prompt comprises:
a plurality of entity relationship types,
at least one example output entity relationship type and output entities for an example content item, and
a request to determine, for the input content item, which entity relationship type of the plurality of entity relationship types and which entities correspond to the input content item;
causing execution of the prompt to determine a particular entity relationship type and two or more entities that correspond to the input content item;
determining at least a particular feature vector of at least a particular entity of the two or more entities;
comparing the particular feature vector to a plurality of feature vectors representing at least a plurality of stored entities defined for a plurality of clusters;
adding the particular entity relationship type and the two or more entities to a particular cluster of the plurality of clusters based at least in part on a proximity, in a multi-dimensional feature space of a feature vector machine learning model, between the particular feature vector and one or more feature vectors representing the particular cluster; and
using the particular cluster to respond to a query about the particular entity.

8. The system of claim 7, wherein the particular cluster is determined for adding the particular entity relationship type and the two or more entities to be a cluster with a highest similarity score among the plurality of clusters determined based at least in part on the comparing the particular feature vector to the plurality of feature vectors.

9. The system of claim 7, wherein, for another particular entity relationship type and another two or more entities that correspond to another input content item, a new cluster is assigned to at least another entity of the other two or more entities when the similarity score between another particular feature vector of the other particular entity relationship type and the other two or more entities and the plurality of feature vectors is below a predefined threshold.

10. The system of claim 7, wherein the plurality of entity relationship types include acquisitions, joint ventures, mergers, bankruptcy, layoffs, lawsuits, and funding.

11. The system of claim 7, wherein each of the plurality of clusters include nodes and edges, the nodes a-e associated with entities and the edges are associated with relationship types.

12. The system of claim 7, wherein the natural language machine learning model comprises a large language model pre-trained to handle text, and wherein the input content item is a news article.

13. A non-transitory computer-readable medium storing a plurality of instructions executable by one or more processors that cause the one or more processors to perform operations comprising:
one or more processors; and
a memory coupled to the one or more processors, the memory storing a plurality of instructions executable by the one or more processors, the plurality of instructions that when executed by the one or more processors cause the one or more processors to perform a set of operations comprising:
receiving an input content item;
for the input content item, generating a prompt to a natural language machine learning model, wherein the prompt comprises:
a plurality of entity relationship types,
at least one example output entity relationship type and output entities for an example content item, and
a request to determine, for the input content item, which entity relationship type of the plurality of entity relationship types and which entities correspond to the input content item;
causing execution of the prompt to determine a particular entity relationship type and two or more entities that correspond to the input content item;
determining at least a particular feature vector of at least a particular entity of the two or more entities;

comparing the particular feature vector to a plurality of feature vectors representing at least a plurality of stored entities defined for a plurality of clusters;

adding the particular entity relationship type and the two or more entities to a particular cluster of the plurality of clusters based at least in part on a proximity, in a multi-dimensional feature space of a feature vector machine learning model, between the particular feature vector and one or more feature vectors representing the particular cluster; and using the particular cluster to respond to a query about the particular entity.

14. The non-transitory computer-readable medium of claim 13, wherein the plurality of entity relationship types include acquisitions, joint ventures, mergers, bankruptcy, layoffs, lawsuits, and funding.

15. The non-transitory computer-readable medium of claim 13, wherein each of the plurality of clusters include nodes and edges, the nodes associated with entities and the edges are associated with relationship types.

16. The non-transitory computer-readable medium of claim 13, wherein the particular cluster is determined for adding the particular entity relationship type and the two or more entities to be a cluster with a highest similarity score among the plurality of clusters determined based at least in part on the comparing the particular feature vector to the plurality of feature vectors.

17. The non-transitory computer-readable medium of claim 13, wherein, for another particular entity relationship type and another two or more entities that correspond to another input content item, a new cluster is assigned to at least another entity of the other two or more entities when the similarity score between another particular feature vector of the other particular entity relationship type and the other two or more entities and the plurality of feature vectors is below a predefined threshold.

18. The non-transitory computer-readable medium of claim 13, wherein the natural language machine learning model comprises a large language model pre-trained to handle text, and wherein the input content item is a news article.

* * * * *